(12) United States Patent
Zhang et al.

(10) Patent No.: US 9,973,849 B1
(45) Date of Patent: May 15, 2018

(54) SIGNAL QUALITY BEAM SELECTION

(71) Applicant: Amazon Technologies, Inc., Seattle, WA (US)

(72) Inventors: Xianxian Zhang, Santa Clara, CA (US); Amit Singh Chhetri, Santa Clara, CA (US); Laurent Andre Ovaert, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/710,382

(22) Filed: Sep. 20, 2017

(51) Int. Cl.
*H04R 3/00* (2006.01)
*H04R 29/00* (2006.01)
*H04M 3/22* (2006.01)

(52) U.S. Cl.
CPC .......... *H04R 3/005* (2013.01); *H04R 29/005* (2013.01); *H04M 3/2236* (2013.01); *H04R 2410/01* (2013.01)

(58) Field of Classification Search
CPC ...... H04R 3/005; H04R 3/04; H04R 2430/25; H04R 29/005
See application file for complete search history.

(56) References Cited

U.S. PATENT DOCUMENTS

| | | | | |
|---|---|---|---|---|
| 7,174,022 B1* | 2/2007 | Zhang | ..................... | H04R 3/005 381/92 |
| 8,954,324 B2* | 2/2015 | Wang | ...................... | G10L 25/78 704/215 |
| 2003/0063759 A1* | 4/2003 | Brennan | ................ | H04R 3/005 381/92 |
| 2004/0013038 A1* | 1/2004 | Kajala | ..................... | G01S 3/043 367/119 |
| 2009/0034752 A1* | 2/2009 | Zhang | .................... | H04R 3/005 381/92 |
| 2013/0304476 A1* | 11/2013 | Kim | .......................... | H04N 7/15 704/270 |
| 2014/0153742 A1* | 6/2014 | Hershey | ................. | H04B 15/00 381/94.1 |
| 2014/0286497 A1* | 9/2014 | Thyssen | ................. | H04R 3/005 381/66 |

OTHER PUBLICATIONS

Microphone array post-filter based on Noise field coherence, ; IEEE transactions on speech and audio processing, vol. 11.No. 6, Nov. 2003.*

* cited by examiner

*Primary Examiner* — Mohammad Islam
(74) *Attorney, Agent, or Firm* — Pierce Atwood LLP

(57) ABSTRACT

A device that includes a first beam selection component that selects a portion of the multiple beams prior to performing adaptive noise cancellation, in addition to a second beam selection component that selects a beam after adaptive noise cancellation is performed. The device only performs adaptive noise cancellation on the portion of the multiple beams that are selected, reducing a complexity of performing adaptive noise cancellation. In addition, as the first beam selection component selects from the multiple beams before adaptive noise cancellation, the quality of the signals are not reduced and/or desired signals are not suppressed, resulting in the first beam selection component increasing a likelihood that the second beam selection component selects the desired beam. The first beam selection component may use a different algorithm and/or selection criteria than the second beam selection component in order to select beams associated with desired signals such as speech.

20 Claims, 16 Drawing Sheets

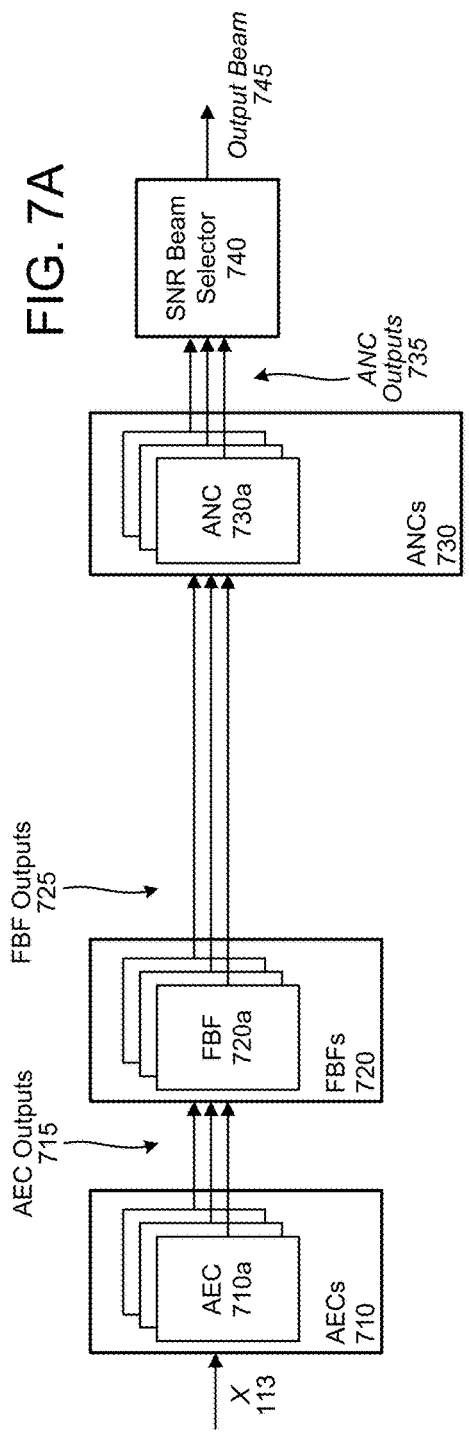
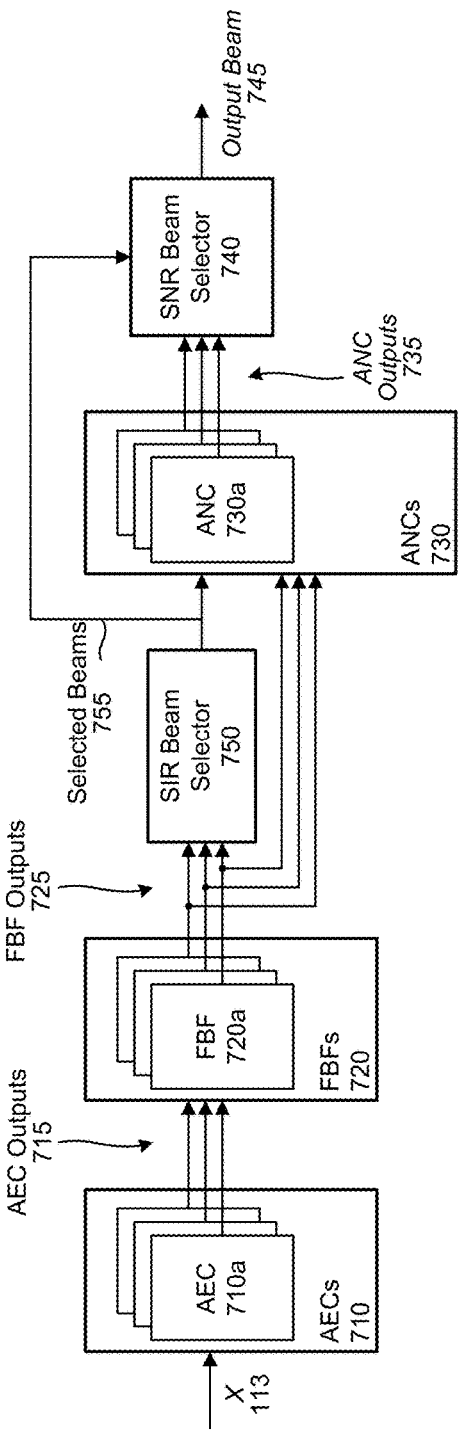

FIG. 9
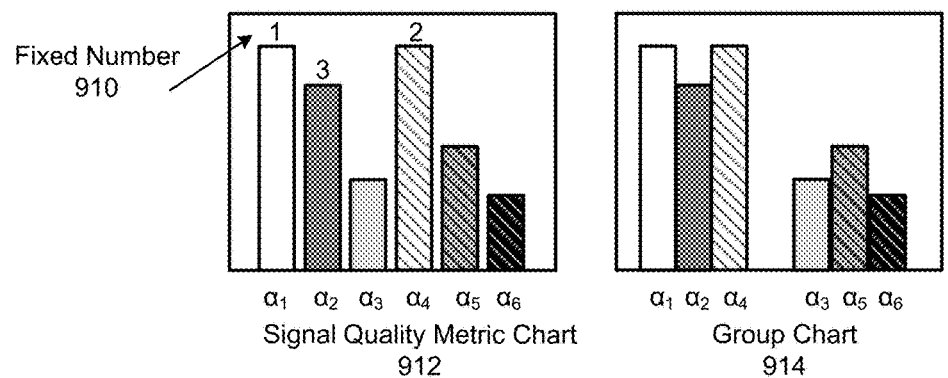
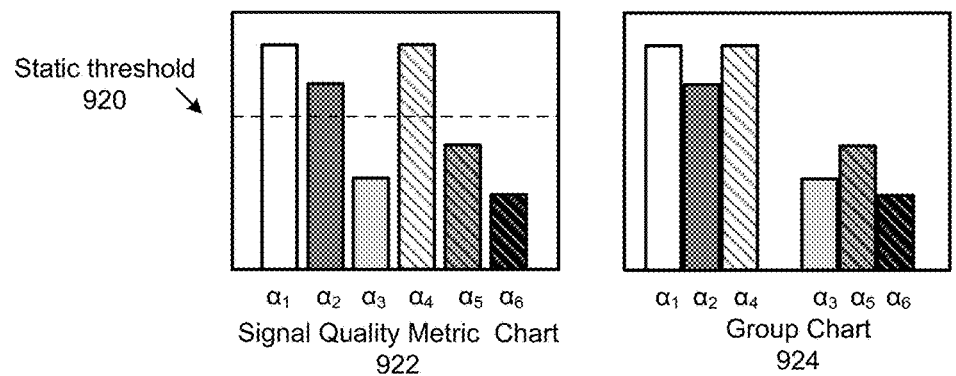
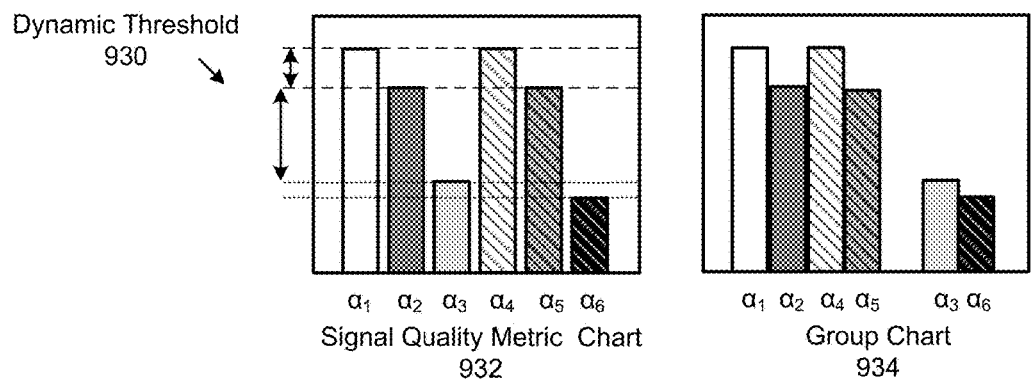

FIG. 11A
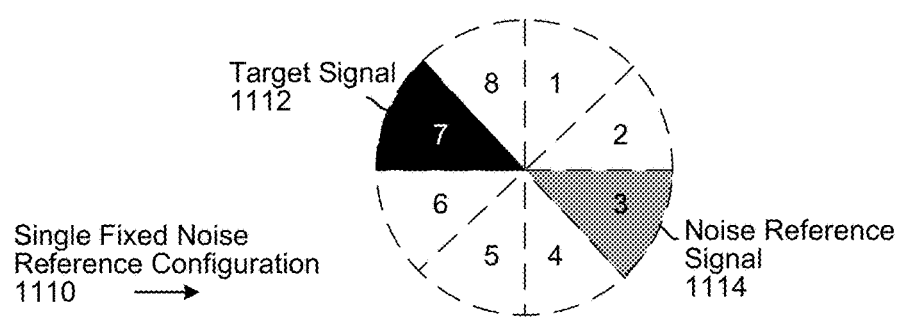
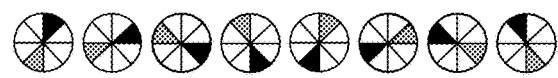
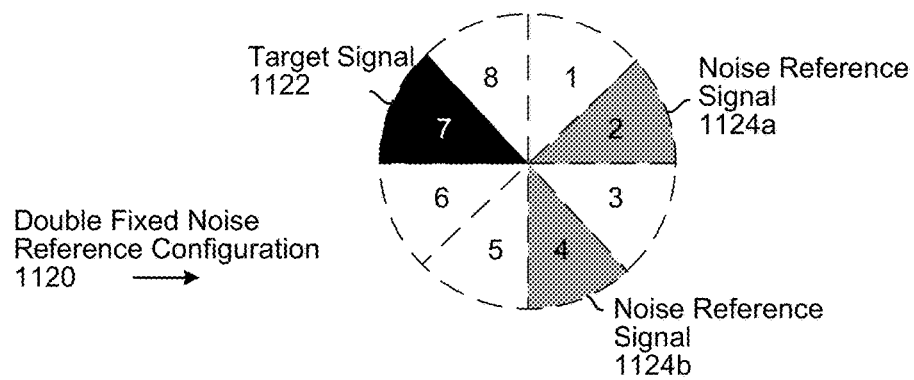
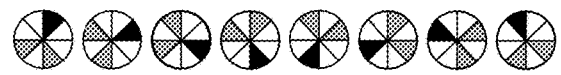

FIG. 11B
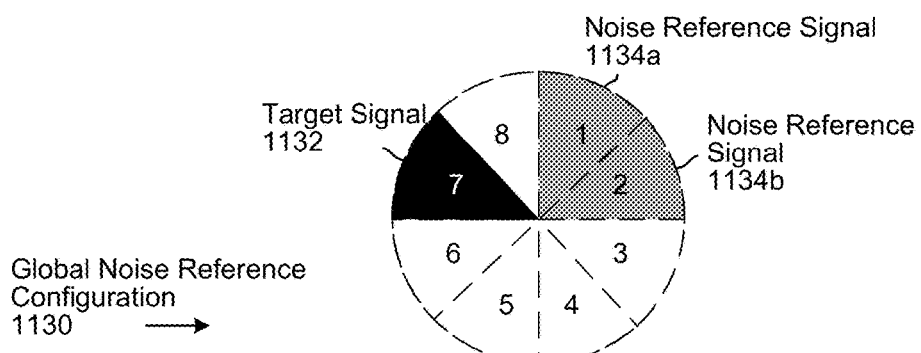
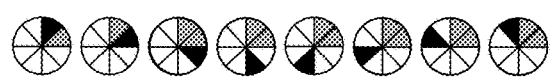
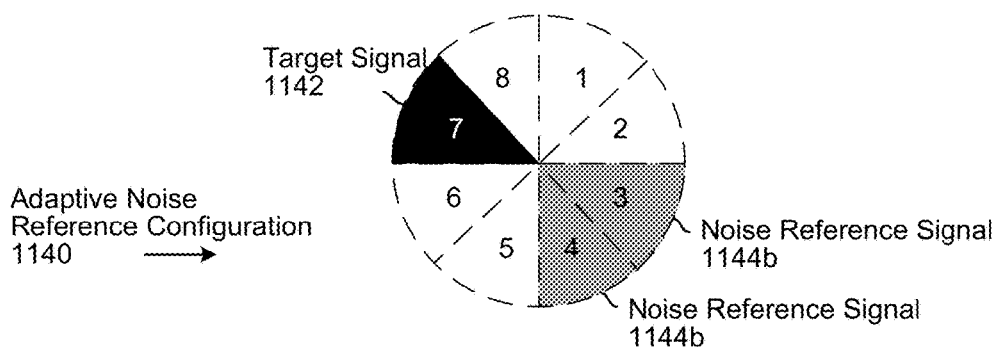
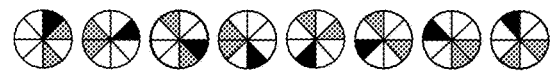
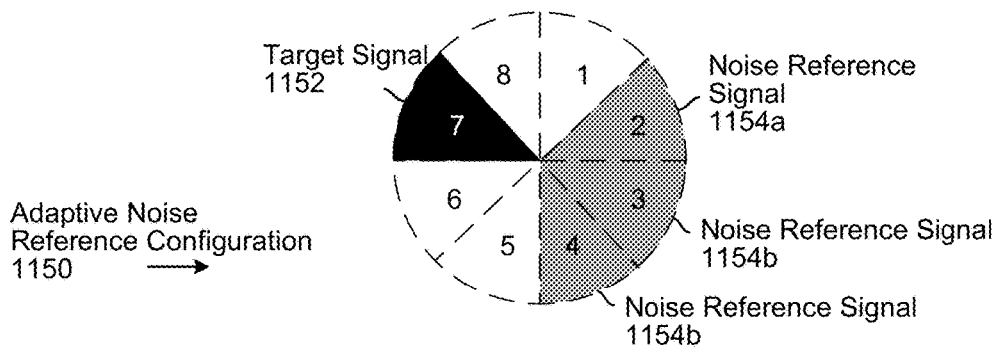
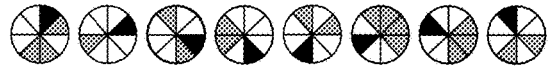

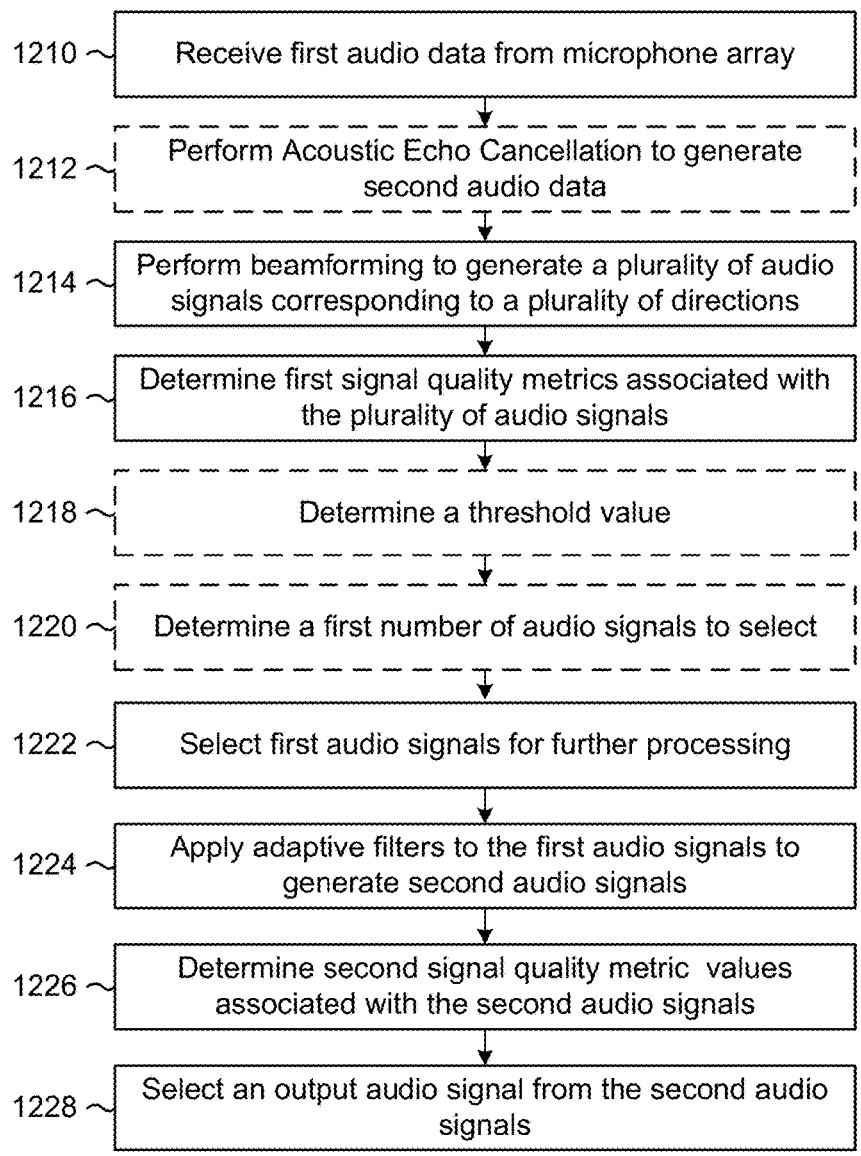

SIGNAL QUALITY BEAM SELECTION

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

BRIEF DESCRIPTION OF DRAWINGS

For a more complete understanding of the present disclosure, reference is now made to the following description taken in conjunction with the accompanying drawings.

FIGS. 7A-7B illustrate an example of improving beam selection according to embodiments of the present disclosure.

FIG. 9 illustrates examples of different thresholds according to embodiments of the present disclosure.

FIGS. 11A-11B illustrate examples of noise reference signals according to embodiments of the present disclosure.

FIG. 12 is a flowchart conceptually illustrating an example method for generating an output audio signal according to embodiments of the present disclosure.

DETAILED DESCRIPTION

Figure 1:
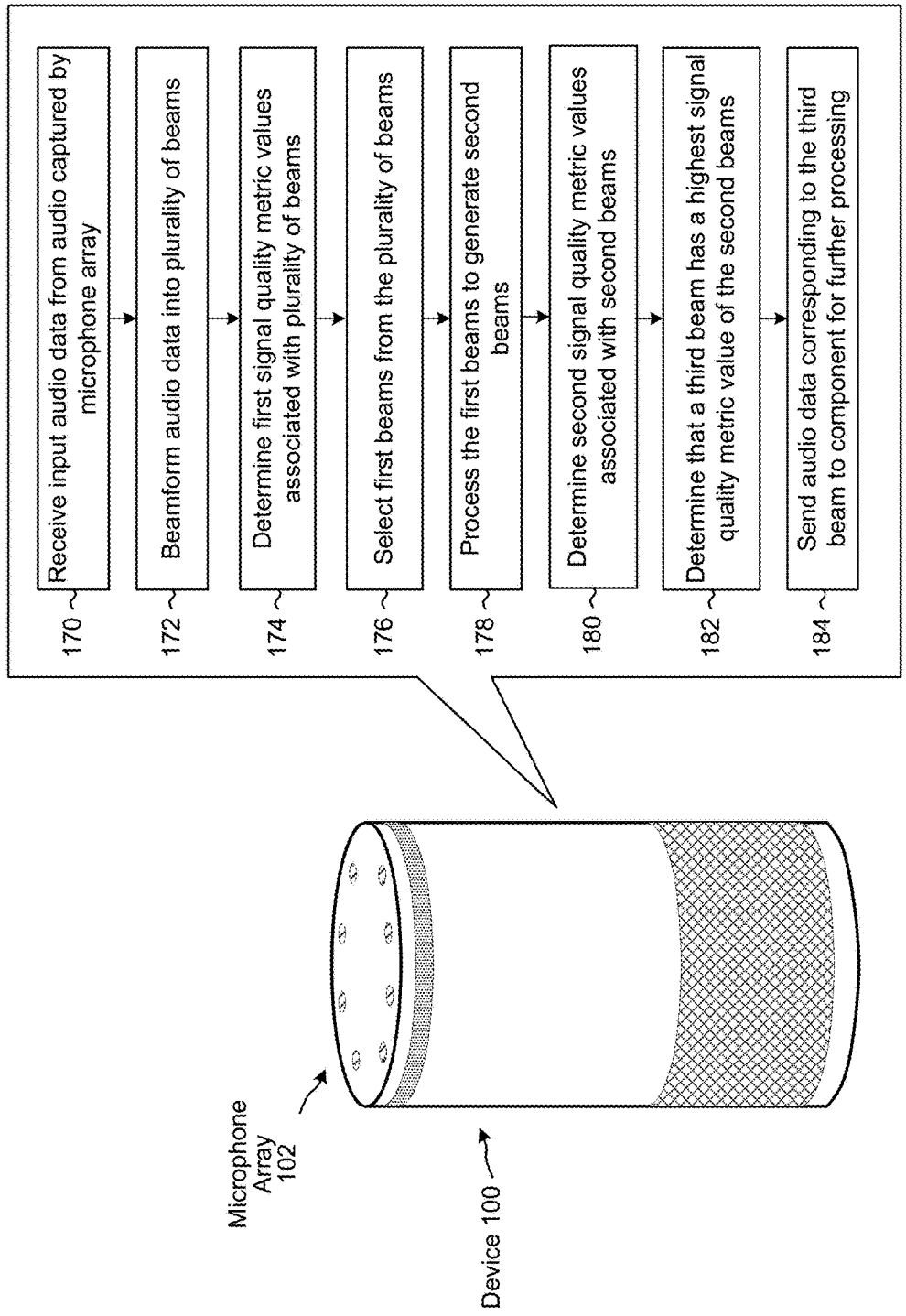
FIG. 1 illustrates a method for improving beam selection and reducing algorithm complexity according to embodiments of the present disclosure.

Certain devices capable of capturing speech for speech processing may operate a using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

As specific components of a device/speech processing system may only be configured to operate on a single stream of audio data, for systems that incorporate a beamformer unit, a device may first select the audio data corresponding to a specific beam and then send that selected audio data to forward on to downstream components for wakeword detection and/or speech processing.

One drawback to this approach is that a beam selection component may operate using techniques that are focused on audio data quality rather than necessarily the content of the audio data. For example, a beam selection component may process audio data corresponding to multiple beams and may analyze various data points of those beams such as signal-to-noise ratio (SNR), energy, degree of persistence, and/or other signal quality metrics. Such features, however, may not always prove adequate and may break down under noisy conditions. In addition, the adaptive noise cancellation may degrade a quality of the signal and/or suppress a desired signal, resulting in the beam selection component not selecting a desired beam. A poorly selected beam may reduce the effectiveness of wakeword detection and speech processing performance.

To improve beam selection, offered is a device that includes a first beam selection component that selects a portion of the multiple beams prior to performing adaptive noise cancellation, in addition to a second beam selection component that selects a beam after adaptive noise cancellation is performed. The device only performs adaptive noise cancellation on the portion of the multiple beams that are selected, reducing a complexity of performing adaptive noise cancellation. In addition, as the first beam selection component selects from the multiple beams before adaptive noise cancellation, the quality of the signals are not reduced and/or desired signals are not suppressed, resulting in the first beam selection component increasing a likelihood that the second beam selection component selects the desired beam. The first beam selection component may use a different algorithm and/or selection criteria than the second beam selection component in order to select beams associated with desired signals such as speech.

FIG. 1 illustrates a device 100 configured to capture audio, perform beamforming, and perform improved beam selection. As shown, the device 100 may include a microphone array 102 as well as other components, such as those discussed below.

The device 100 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 102 may generate the beamformed audio data by boosting an audio signal originating from the desired direction (e.g., look direction) while attenuating audio signals that originate from other directions, although the disclosure is not limited thereto.

To perform the beamforming operation, the device 102 may apply directional calculations to the input audio signals. In some examples, the device 102 may perform the directional calculations by applying filters to the input audio signals using filter coefficients associated with specific directions. For example, the device 102 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 102. For example, the device 102 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 102 may perform a first beamforming operation to divide input audio data into 36 different portions, with each portion associated with a specific direction (e.g., 10 degrees out of 360 degrees) relative to the device 102. At a second time, however, the device 102 may perform a second beamforming operation to divide input audio data into 6 different portions, with each portion associated with a specific direction (e.g., 60 degrees out of 360 degrees) relative to the device 102.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 102 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam The device 100 may receive (170) input audio data corresponding to audio captured by the microphone array 102. The device may then beamform (172) the audio data into a plurality of beams (e.g., perform a beamforming operation to generate beamformed audio data). As used herein, the term beam may refer to particular audio data corresponding to the input audio data that was captured by the microphone array, where the particular audio data of a beam corresponds to a particular direction. Thus, each beam may include audio data corresponding to a particular direction relative to the device 100. So a beamforming unit or component of the device (such as beamformer unit 190 discussed below) may divide input audio data from an array into different beams of audio data, each corresponding to a direction.

The device 100 may determine (174) first signal quality metric values associated with the plurality of beams and may select (176) first beams from the plurality of beams for additional processing. The device 100 may process (178) the first beams to generate second beams, such as by performing adaptive noise cancellation, described in greater detail below.

The device 100 may determine (180) second signal quality metric values associated with the second beams, may determine (182) that a third beam has a highest signal quality metric value of the second beams and may send (184) audio data corresponding to the third beam to a component for further processing. Such a downstream component may include, for example, a trigger word/wakeword detection component, a speech processing component (which may be remote from the device 100), a further audio data processing component, some combination thereof, or some other downstream component.

Further details of the device operation are described below following a discussion of directionality in reference to FIGS. 2-3C.

Figure 2:
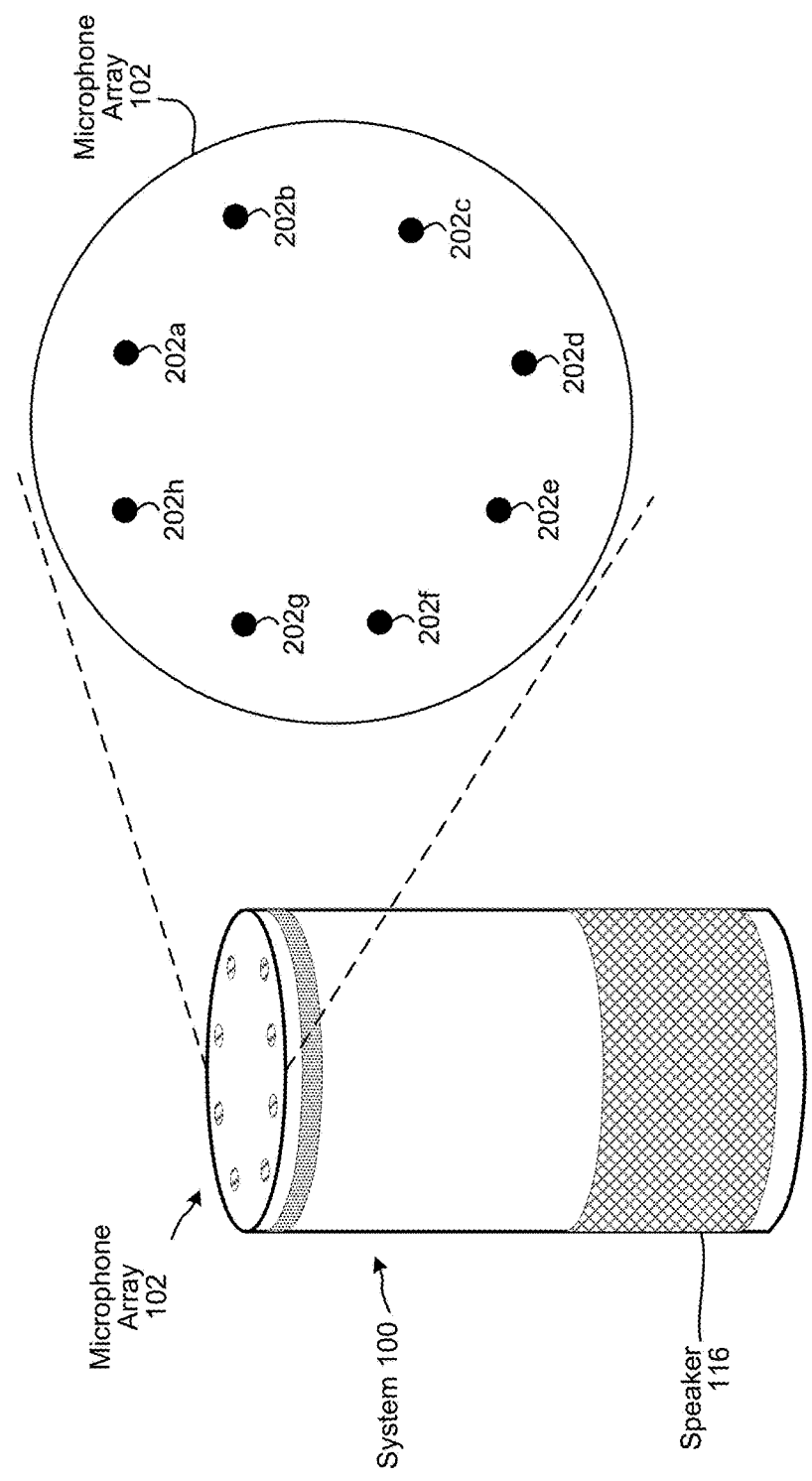
FIG. 2 illustrates a microphone array according to embodiments of the present disclosure.

As illustrated in FIG. 2, a device 100 may include, among other components, a microphone array 102, a speaker 116, a beamformer unit (as discussed below), or other components. The microphone array may include a number of different individual microphones. In the example configuration of FIG. 2, the array 102 includes eight (8) microphones, 202a-202h. The individual microphones may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Figure 3A:
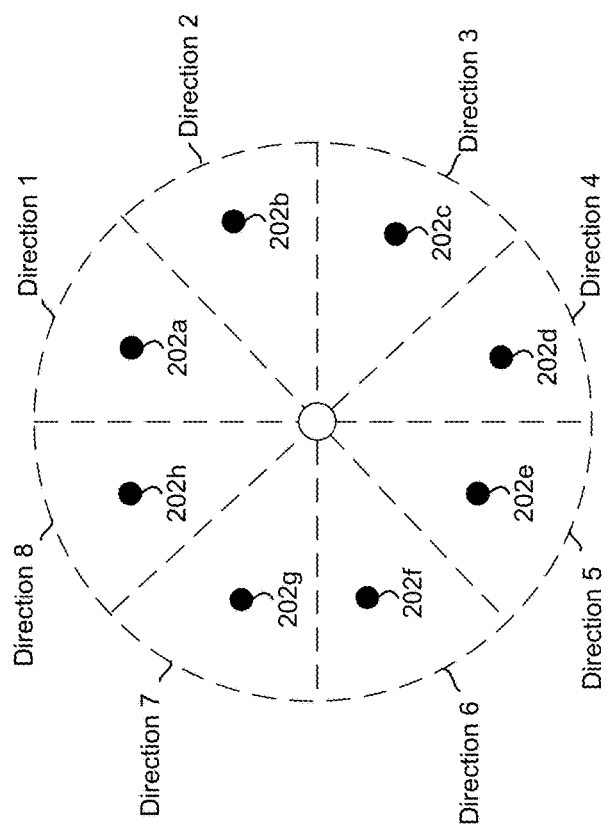
FIG. 3A illustrates associating directions with microphones of a microphone array according to embodiments of the present disclosure.
Figure 3B:
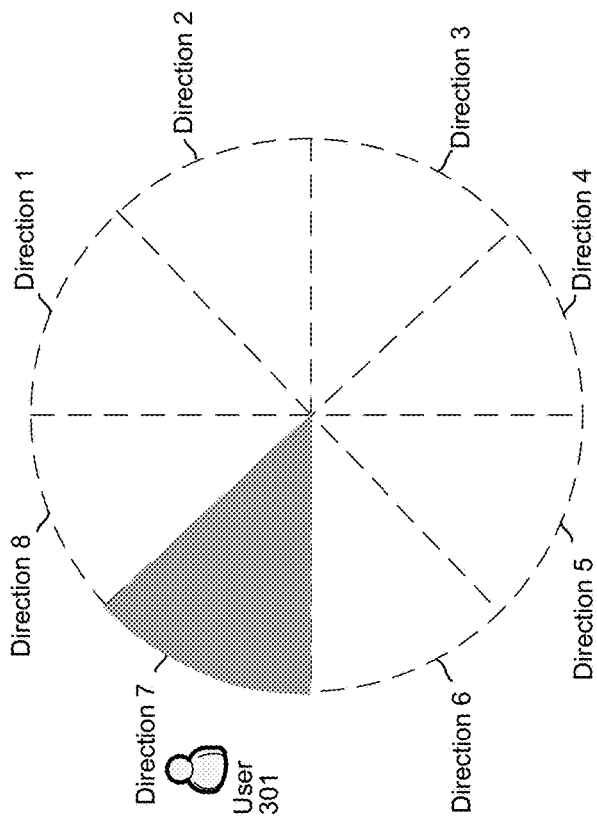
FIGS. 3B and 3C illustrate isolating audio from a direction to focus on a desired audio source according to embodiments of the present disclosure.
Figure 3C:
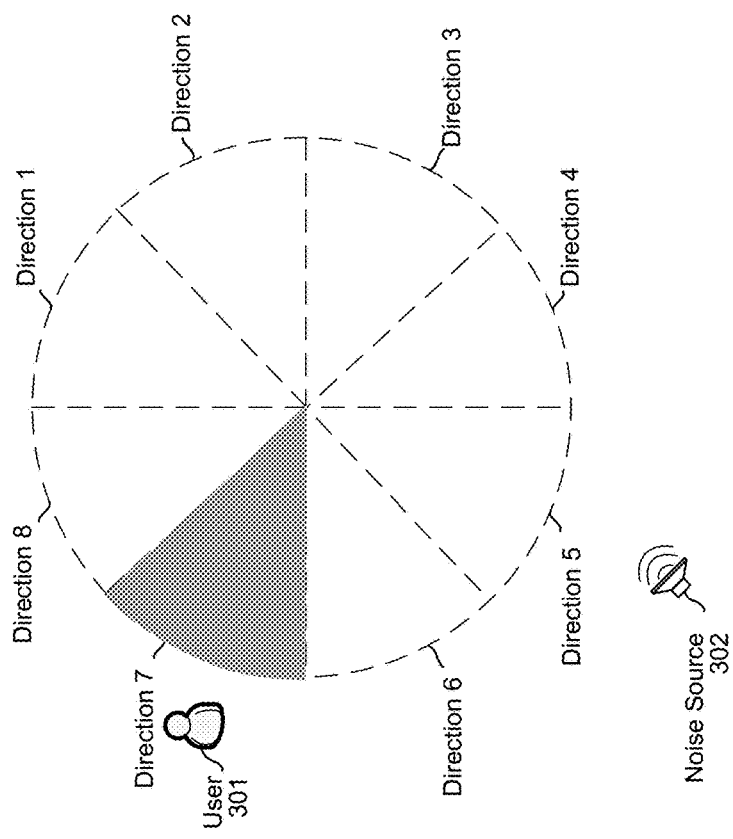

Using such direction isolation techniques, a device 100 may isolate directionality of audio sources. As shown in FIG. 3A, a particular direction may be associated with a particular microphone of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 202a, direction 2 is associated with microphone 202b, and so on. Alternatively, particular directions and/or beams may not necessarily be associated with a specific microphone.

To isolate audio from a particular direction the device may apply a variety of audio filters to the output of the microphones where certain audio is boosted while other audio is dampened, to create isolated audio corresponding to a particular direction, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

The device may use various techniques to determine the beam corresponding to the look-direction. If audio is detected first by a particular microphone the device 100 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

For example, if audio data corresponding to a user's speech is first detected and/or is most strongly detected by microphone 202g, the device may determine that the user is located in a location in direction 7. Using a FBF unit or other such component, the device may isolate audio coming from direction 7 using techniques known to the art and/or explained herein. Thus, as shown in FIG. 4B, the device 100 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

One drawback to the FBF unit approach is that it may not function as well in dampening/cancelling noise from a noise source that is not diffuse, but rather coherent and focused from a particular direction. For example, as shown in FIG. 3C, a noise source 302 may be coming from direction 5 but may be sufficiently loud that noise cancelling/beamforming techniques using an FBF unit alone may not be sufficient to remove all the undesired audio coming from the noise source 302, thus resulting in an ultimate output audio signal determined by the device 100 that includes some representation of the desired audio resulting from user 301 but also some representation of the undesired audio resulting from noise source 302.

Figure 4:
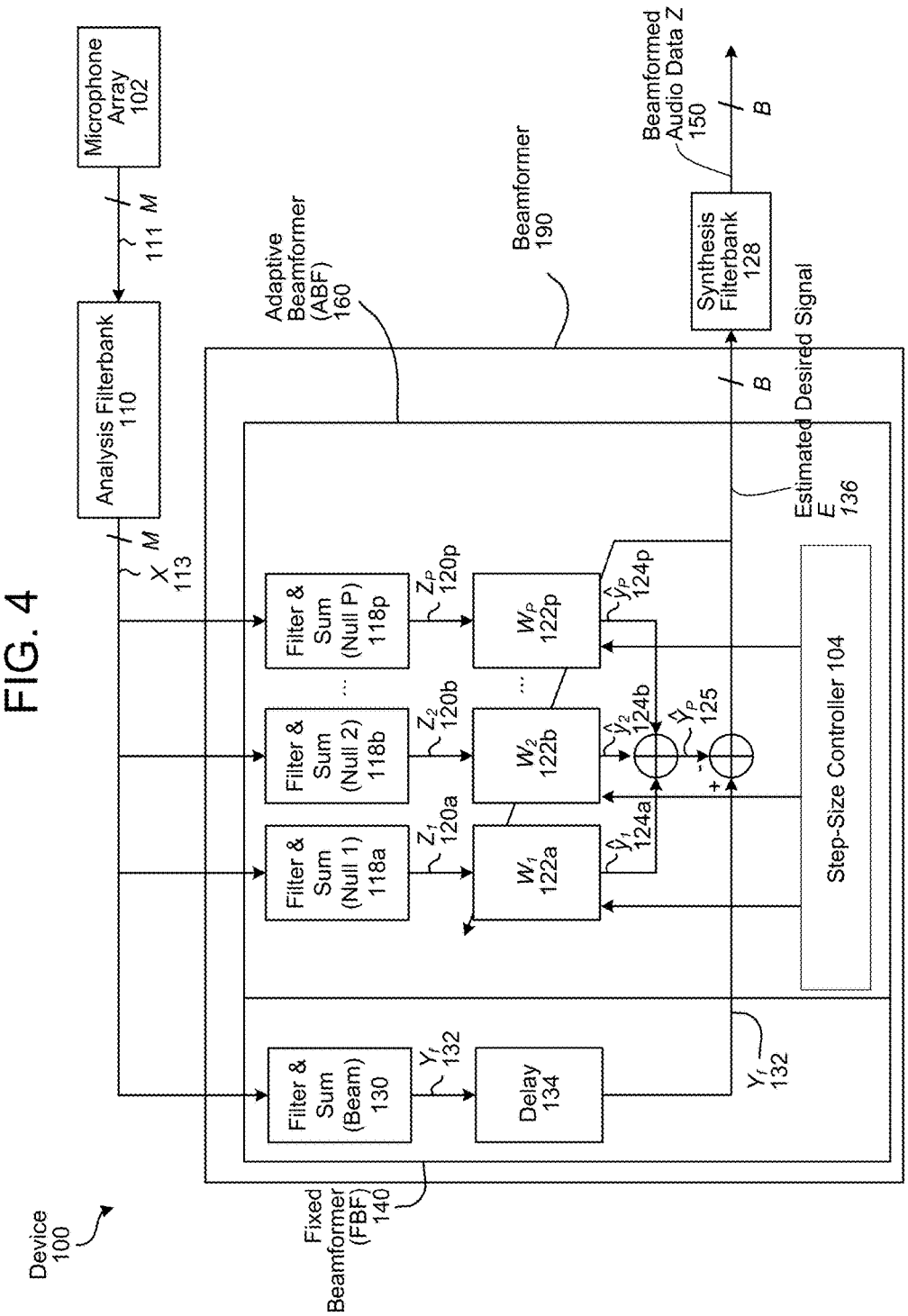
FIG. 4 illustrates a beamforming device that combines a fixed beamformer unit and an adaptive beamformer unit according to embodiments of the present disclosure.

FIG. 4 illustrates a high-level conceptual block diagram of a device 100 configured to performing beamforming using a fixed beamformer unit and an adaptive noise canceller that can remove noise from particular directions using adaptively controlled coefficients which can adjust how much noise is cancelled from particular directions. The FBF unit 140 may be a separate component or may be included in another component such as a general beamformer unit 190. As explained below, the FBF unit may operate a filter and sum component 130 to isolate the first audio signal from the direction of an audio source.

The device 100 may also operate an adaptive beamformer (ABF) unit 160 to amplify audio signals from directions other than the direction of an audio source. Those audio signals represent noise signals so the resulting amplified audio signals from the ABF unit may be referred to as noise reference signals 120, discussed further below. The device 100 may then weight the noise reference signals, for example using filters 122 discussed below. The device may combine the weighted noise reference signals 124 into a combined (weighted) noise reference signal 125. Alternatively the device may not weight the noise reference signals and may simply combine them into the combined noise reference signal 125 without weighting. The device may then subtract the combined noise reference signal 125 from the amplified first audio signal 132 to obtain a difference 136. The device may then output that difference, which represents the desired output audio signal with the noise removed. The diffuse noise is removed by the FBF unit when determining the signal 132 and the directional noise is removed when the combined noise reference signal 125 is subtracted. The device may also use the difference to create updated weights (for example for filters 122) to create updated weights that may be used to weight future audio signals. The step-size controller 104 may be used modulate the rate of adaptation from one weight to an updated weight.

In this manner noise reference signals are used to adaptively estimate the noise contained in the output signal of the FBF unit using the noise-estimation filters 122. This noise estimate is then subtracted from the FBF unit output signal to obtain the final ABF unit output signal. The ABF unit output signal is also used to adaptively update the coefficients of the noise-estimation filters. Lastly, we make use of a robust step-size controller to control the rate of adaptation of the noise estimation filters.

As shown in FIG. 4, input audio data 111 captured by a microphone array may be input into an analysis filterbank 110. The filterbank 110 may include a uniform discrete Fourier transform (DFT) filterbank which converts input audio data 111 in the time domain into an audio signal X 113 in the sub-band domain. The audio signal X may incorporate audio signals corresponding to multiple different microphones as well as different sub-bands (i.e., frequency ranges) as well as different frame indices (i.e., time ranges). Thus the audio signal from the mth microphone may be represented as $X_m(k, n)$, where k denotes the sub-band index and n denotes the frame index. The combination of all audio signals for all microphones for a particular sub-band index frame index may be represented as $X(k,n)$.

Figure 5:
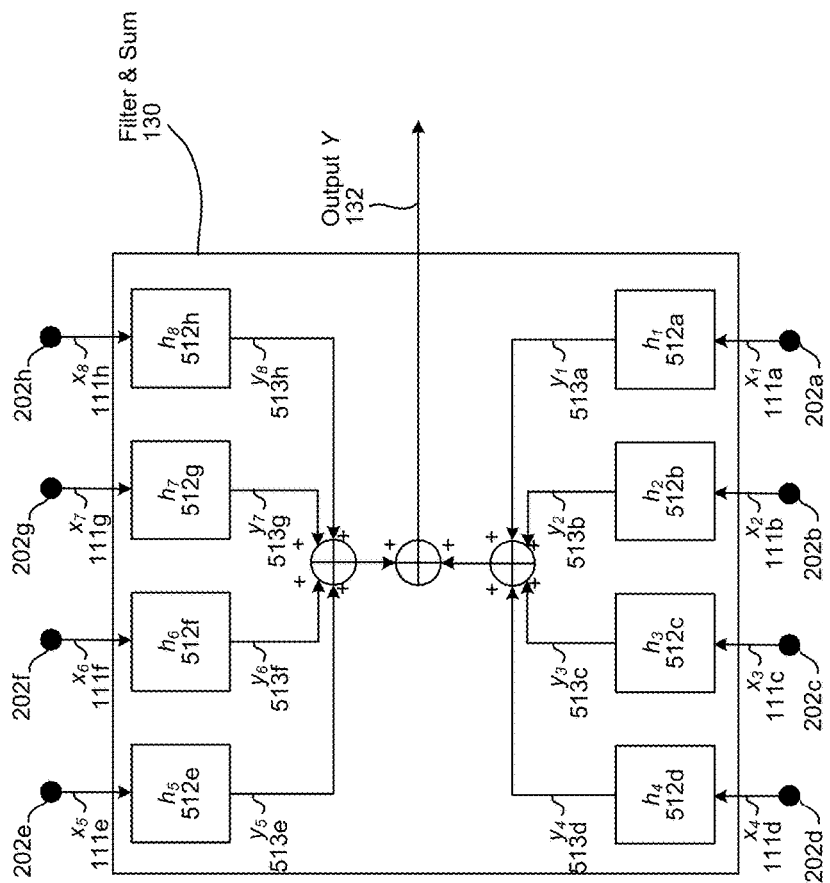
FIG. 5 illustrates a filter and sum component according to embodiments of the present disclosure.

The audio signal X 113 may be passed to the FBF unit 140 including the filter and sum unit 130. The FBF unit 140 may be implemented as a robust super-directive beamformer unit, delayed sum beamformer unit, or the like. The FBF unit 140 is presently illustrated as a super-directive beamformer (SDBF) unit due to its improved directivity properties. The filter and sum unit 130 takes the audio signals from each of the microphones and boosts the audio signal from the microphone associated with the desired look direction and attenuates signals arriving from other microphones/directions. The filter and sum unit 130 may operate as illustrated in FIG. 5. As shown in FIG. 5, the filter and sum unit 130 may be configured to match the number of microphones of the microphone array. For example, for a microphone array with eight microphones, the filter and sum unit may have eight filter blocks 512. The input audio signals $x_1$ 111a through $x_8$ 111h for each microphone (e.g., microphones 1 through 8) are received by the filter and sum unit 130. The audio signals $x_1$ 111a through $x_8$ 111h correspond to individual microphones 202a through 202h, for example audio signal $x_1$ 111a corresponds to microphone 202a, audio signal $x_2$ 111b corresponds to microphone 202b and so forth. Although shown as originating at the microphones, the audio signals $x_1$ 111a through $x_8$ 111h may be in the sub-band domain and thus may actually be output by the analysis filterbank before arriving at the filter and sum component 130. Each filter block 512 is also associated with a particular microphone. Each filter block is configured to either boost (e.g., increase) or dampen (e.g., decrease) its respective incoming audio signal by the respective beamformer filter coefficient h depending on the configuration of the FBF unit. Each resulting filtered audio signal y 513 will be the audio signal x 111 weighted by the beamformer filter coefficient h of the filter block 512. For example, $y_1=x_1*h_1$, $y_2=x_2*h_2$, and so forth. The filter coefficients are configured for a particular FBF unit associated with a particular beam.

Figure 6:
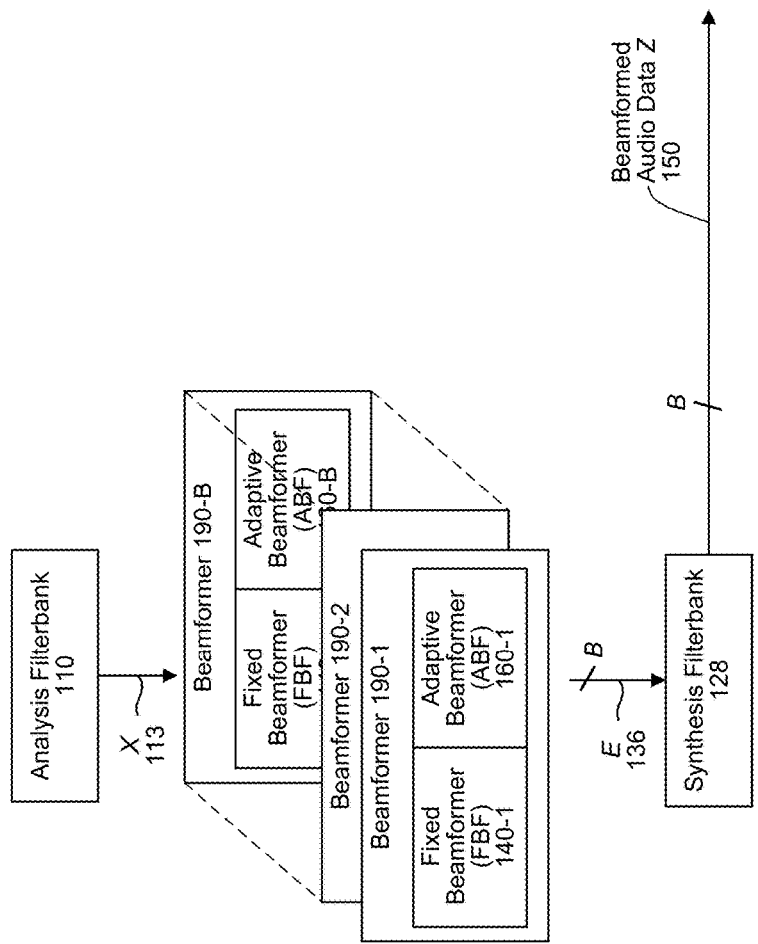
FIG. 6 illustrates a multiple FBF/ABF beamformer unit configuration for each beam according to embodiments of the present disclosure.

As illustrated in FIG. 6, the beamformer unit 190 configuration (including the FBF unit 140 and the ABF unit 160) illustrated in FIG. 4, may be implemented multiple times in a single device 100. The number of beamformer unit 190 blocks may correspond to the number of beams B. For example, if there are eight beams, there may be eight FBF units 140 and eight ABF units 160. Each beamformer unit 190 may operate as described in reference to FIG. 4, with an individual output E 136 for each beam created by the respective beamformer unit 190. Thus, B different outputs 136 may result. For device configuration purposes, there may also be B different other components, such as the synthesis filterbank 128, but that may depend on device configuration. Each individual beamformer unit 190 may result in its own beamformed audio data Z 150, such that there may be B different beamformed audio data portions Z 150. Each beam's respective beamformed audio data Z 150 may be in a format corresponding to an input audio data 111 or in an alternate format. For example, the input audio data 111 and/or the beamformed audio data Z 150 may be sampled at a rate corresponding to 16 kHz and a mono-channel at 16 bits per sample, little endian format. Audio data in little endian format corresponds to storing the least significant byte of the audio data in the smallest address, as opposed to big endian format where the most significant byte of the audio data is stored in the smallest address.

Each particular FBF unit may be tuned with filter coefficients to boost audio from one of the particular beams. For example, FBF unit 140-1 may be tuned to boost audio from beam 1, FBF unit 140-2 may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF unit 140-7, direction 7, the beamformer filter coefficient $h_7$ for filter 512g may be high while beamformer filter coefficients $h_1$-$h_6$ and $h_8$ may be lower. Thus the filtered audio signal y will be comparatively stronger than the filtered audio signals $y_1$-$y_6$ and $y_8$ thus boosting audio from direction 7 relative to the other directions. The filtered audio signals will then be summed together to create the output audio signal The filtered audio signals will then be summed together to create the output audio signal $Y_f$ 132. Thus, the FBF unit 140 may phase align microphone data toward a give n direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficients may be represented as $H_{BF,m}(r)$, where r=0, ... R, where R denotes the number of beamformer filter coefficients in the subband domain. Thus, the output $Y_f$ 132 of the filter and sum unit 130 may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n-r) \qquad (1)$$

Turning once again to FIG. 4, the output $Y_f$ 132, expressed in Equation 1, may be fed into a delay component 134, which delays the forwarding of the output Y until further adaptive noise cancelling functions as described below may be performed. One drawback to output $Y_f$ 132, however, is that it may include residual directional noise that was not canceled by the FBF unit 140. To remove that directional noise, the device 100 may operate an adaptive beamformer unit 160 which includes components to obtain the remaining noise reference signal which may be used to remove the remaining noise from output Y.

As shown in FIG. 4, the adaptive noise canceller may include a number of nullformer blocks 118a through 118p. The device 100 may include P number of nullformer blocks 118 where P corresponds to the number of channels, where each channel corresponds to a direction in which the device may focus the nullformers 118 to isolate detected noise. The number of channels P is configurable and may be predetermined for a particular device 100. Each nullformer block is configured to operate similarly to the filter and sum block 130, only instead of the filter coefficients for the nullformer blocks being selected to boost the look ahead direction, they are selected to boost one of the other, non-look ahead directions. Thus, for example, nullformer 118a is configured to boost audio from direction 1, nullformer 118b is configured to boost audio from direction 2, and so forth. Thus, the nullformer may actually dampen the desired audio (e.g., speech) while boosting and isolating undesired audio (e.g., noise). For example, nullformer 118a may be configured (e.g., using a high filter coefficient $h_1$ 512a) to boost the signal from microphone 202a/direction 1, regardless of the look ahead direction. Nullformers 118b through 118p may operate in similar fashion relative to their respective microphones/directions, though the individual coefficients for a particular channel's nullformer in one beam pipeline may differ from the individual coefficients from a nullformer for the same channel in a different beam's pipeline. The output Z 120 of each nullformer 118 will be a boosted signal corresponding to a non-desired direction. As audio from non-desired direction may include noise, each signal Z 120 may be referred to as a noise reference signal. Thus, for each channel 1 through P the adaptive beamformer unit 160 calculates a noise reference signal Z 120, namely $Z_1$ 120a through $Z_P$ 120p. Thus, the noise reference signals that are acquired by spatially focusing towards the various noise sources in the environment and away from the desired look-direction. The noise reference signal for channel p may thus be represented as $Z_p$ (k, n) where $Z_P$ is calculated as follows:

$$Z_p(k, n) = \sum_{m=1}^{M} \sum_{r=0}^{R} H_{NF,m}(p, r) X_m(k, n-r) \quad (2)$$

where $H_{NF,m}(p,r)$ represents the nullformer coefficients for reference channel p.

As described above, the coefficients for the nullformer filters 512 are designed to form a spatial null toward the look ahead direction while focusing on other directions, such as directions of dominant noise sources (e.g., noise source 302). The output from the individual nullformers $Z_1$ 120a through $Z_P$ 120p thus represent the noise from channels 1 through P.

The individual noise reference signals may then be filtered by noise estimation filter blocks 122 configured with weights W to adjust how much each individual channel's noise reference signal should be weighted in the eventual combined noise reference signal $\hat{Y}$ 125. The noise estimation filters (further discussed below) are selected to isolate the noise to be removed from output $Y_f$ 132. The individual channel's weighted noise reference signal $\hat{y}$ 124 is thus the channel's noise reference signal Z multiplied by the channel's weight W. For example, $\hat{y}_1 = Z_1 * W_1$, $\hat{y}_2 = Z_2 * W_2$, and so forth. Thus, the combined weighted noise estimate $\hat{Y}$ 125 may be represented as:

$$\hat{Y}_P(k, n) = \sum_{l=0}^{L} W_P(k, n, l) z_P(k, n-l) \quad (3)$$

where $W_p$ (k,n,l) is the lth element of $W_p$(k,n) and l denotes the index for the filter coefficient in subband domain. The noise estimates of the P reference channels are then added to obtain the overall noise estimate:

$$\hat{Y}(k, n) = \sum_{p=1}^{P} \hat{Y}_p(k, n) \quad (4)$$

The combined weighted noise reference signal $\hat{Y}$ 125, which represents the estimated noise in the audio signal, may then be subtracted from the FBF unit output $Y_f$ 132 to obtain a signal E 136, which represents the error between the combined weighted noise reference signal $\hat{Y}$ 125 and the FBF unit output $Y_f$ 132. That error, E 136, is thus the estimated desired non-noise portion (e.g., target signal portion) of the audio signal and may be the output of the adaptive beamformer unit 160. That error, E 136, may be represented as:

$$E(k,n) = Y(k,n) - \hat{Y}(k,n) \quad (5)$$

As shown in FIG. 4, the ABF unit output signal 136 may also be used to update the weights W of the noise estimation filter blocks 122 using sub-band adaptive filters, such as with a normalized least mean square (NLMS) approach:

$$W_p(k, n) = W_p(k, n-1) + \frac{\mu_p(k, n)}{\|z_p(k, n)\|^2 + \varepsilon} z_p(k, n) E(k, n) \quad (6)$$

where $Z_p(k,n) = [Z_p(k,n) \ Z \ (k,n-1) \ldots Z \ (k,n-L)]^T$ is the noise estimation vector for the pth channel, $\mu_p(k,n)$ is the adaptation step-size for the pth channel, and $\epsilon$ is a regularization factor to avoid indeterministic division. The weights may correspond to how much noise is coming from a particular direction.

As can be seen in Equation 6, the updating of the weights W involves feedback. The weights W are recursively updated by the weight correction term (the second half of the right hand side of Equation 6) which depends on the adaptation step size, $\mu_p(k,n)$, which is a weighting factor adjustment to be added to the previous weighting factor for the filter to obtain the next weighting factor for the filter (to be applied to the next incoming signal). To ensure that the weights are updated robustly (to avoid, for example, target signal cancellation) the step size $\mu_p(k,n)$ may be modulated according to signal conditions. For example, when the desired signal arrives from the look-direction, the step-size is significantly reduced, thereby slowing down the adaptation process and avoiding unnecessary changes of the weights W. Likewise, when there is no signal activity in the look-direction, the step-size may be increased to achieve a larger value so that weight adaptation continues normally. The step-size may be greater than 0, and may be limited to a maximum value. Thus, the device may be configured to determine when there is an active source (e.g., a speaking user) in the look-direction. The device may perform this determination with a frequency that depends on the adaptation step size.

The step-size controller 104 will modulate the rate of adaptation. Although not shown in FIG. 4, the step-size controller 104 may receive various inputs to control the step size and rate of adaptation including the noise reference signals 120, the FBF unit output $Y_f$ 132, the previous step size, the nominal step size (described below) and other data. The step-size controller may calculate Equations 6-13 below. In particular, the step-size controller 104 may compute the adaptation step-size for each channel p, sub-band k, and frame n. To make the measurement of whether there is an active source in the look-direction, the device may measure a ratio of the energy content of the beam in the look direction (e.g., the look direction signal in output $Y_f$ 132) to the ratio of the energy content of the beams in the non-look directions (e.g., the non-look direction signals of noise reference signals $Z_1$ 120a through $Z_P$ 120p). This may be referred to as a beam-to-null ratio (BNR). For each subband, the device may measure the BNR. If the BNR is large, then an active source may be found in the look direction, if not, an active source may not be in the look direction.

The BNR may be computed as:

$$BNR_p(k, n) = \frac{B_{YY}(k, n)}{N_{ZZ,p}(k, n) + \delta}, k \in [k_{LB}, k_{UB}] \quad (7)$$

where, $k_{LB}$ denotes the lower bound for the subband range bin and $k_{UB}$ denotes the upper bound for the subband range bin under consideration, and $\delta$ is a regularization factor. Further, $B_{YY}(k,n)$ denotes the powers of the fixed beamformer output signal (e.g., output $Y_f$ 132) and $N_{ZZ,p}(k,n)$ denotes the powers of the pth nullformer output signals (e.g., the noise reference signals $Z_1$ 120a through $Z_P$ 120p). The powers may be calculated using first order recursive averaging as shown below:

$$B_{YY}(k,n) = \alpha B_{YY}(k,n-1) + (1-\alpha)|Y(k,n)|^2$$

$$N_{ZZ,p}(k,n) = \alpha N_{ZZ,p}(k,n-1) + (1-\alpha)|Z_p(k,n)|^2 \quad (8)$$

where, $\alpha \in [0,1]$ is a smoothing parameter.

The BNR values may be limited to a minimum and maximum value as follows:

$$BNR_p(k,n) \in [BNR_{min}, BNR_{max}]$$

the BNR may be averaged across the subband bins:

$$BNR_p(n) = \frac{1}{(k_{UB} - k_{LB} + 1)} \sum_{k_{LB}}^{k_{UB}} BNR_p(k, n) \quad (9)$$

the above value may be smoothed recursively to arrive at the mean BNR value:

$$\overline{BNR}_p(n) = \beta \overline{BNR}_p(n-1) + (1-\beta) BNR_p(n) \quad (10)$$

where $\beta$ is a smoothing factor.

The mean BNR value may then be transformed into a scaling factor in the interval of [0,1] using a sigmoid transformation:

$$\xi(n) = 1 - 0.5\left(1 + \frac{\upsilon(n)}{1 + |\upsilon(n)|}\right) \quad (11)$$

where $\upsilon(n) = \gamma(\overline{BNR}_p(n) - \sigma)$ (12)

and $\gamma$ and $\sigma$ are tunable parameters that denote the slope ($\gamma$) and point of inflection ($\sigma$), for the sigmoid function.

Using Equation 11, the adaptation step-size for subband k and frame-index n is obtained as:

$$\mu_p(k, n) = \xi(n) \left( \frac{N_{zz,p}(k, n)}{B_{YY}(k, n) + \delta} \right) \mu_o \quad (13)$$

where $\mu_o$ is a nominal step-size. $\mu_o$ may be used as an initial step size with scaling factors and the processes above used to modulate the step size during processing.

At a first time period, audio signals from the microphone array 102 may be processed as described above using a first set of weights for the filters 122. Then, the error E 136 associated with that first time period may be used to calculate a new set of weights for the filters 122, where the new set of weights is determined using the step size calculations described above. The new set of weights may then be used to process audio signals from a microphone array 102 associated with a second time period that occurs after the first time period. Thus, for example, a first filter weight may be applied to a noise reference signal associated with a first audio signal for a first microphone/first direction from the first time period. A new first filter weight may then be calculated using the method above and the new first filter weight may then be applied to a noise reference signal associated with the first audio signal for the first microphone/first direction from the second time period. The same process may be applied to other filter weights and other audio signals from other microphones/directions.

The above processes and calculations may be performed across sub-bands k, across channels p and for audio frames n, as illustrated in the particular calculations and equations.

The estimated non-noise (e.g., output) audio signal E 136 may be processed by a synthesis filterbank 128 which converts the signal 136 into time-domain beamformed audio data Z 150 which may be sent to a downstream component for further operation. As illustrated in FIG. 6, there may be one component audio signal E 136 for each beam, thus for B beams there may be B audio signals E 136. Similarly, there may be one stream of beamformed audio data Z 150 for each beam, thus for B beams there may be B beamformed audio signals B 150. For example, a first beamformed audio signal may correspond to a first beam and to a first direction, a second beamformed audio signal may correspond to a second beam and to a second direction, and so forth.

As shown in FIGS. 4 and 7, the input audio data from a microphone array may include audio data 111 for each microphone 0 through M in the time domain, which may be converted by the analysis filterbank into spectral domain audio signals X 113 for each microphone 0 through M. The beamformer unit may then convert the audio signals X 113 into beamformer output signals E 136 in the spectral domain, with one signal for each beam 0 through B. The synthesis filterbank may then may convert the signals E 136 into time domain beamformer audio data Z 150, with one set of audio data Z 150 for each beam 0 through B.

FIGS. 7A-7B illustrate an example of improving beam selection according to embodiments of the present disclosure. As illustrated in FIG. 7A, typically beam selection is performed once, after performing adaptive noise cancellation (ANC). For example, an audio signal X 113 is input to one or more acoustic echo cancellation components (AECs) 710 and the AECs generate AEC outputs 715 by canceling an echo. To illustrate an example of cancelling an echo, reference audio data may be sent to one or more loudspeakers that may generate output audio based on the reference audio data. For example, the reference audio data may correspond to music and the one or more loudspeakers may play the music. The microphone array may capture a representation of the output audio as an "echo signal," such as capturing the music played by the one or more loudspeakers. Therefore, a portion of the audio signal X 113 may correspond to the output audio or "echo" and may interfere with speech processing or other processing that is used to process an utterance (e.g., speech) captured by the microphone array.

To remove or cancel the echo signal from the audio signal X 113, in some examples the AECs 710 may determine an estimated echo signal based on the reference audio data. For example, the device 100 may process the reference audio data, synchronize the reference audio data with the audio signal X 113, apply adaptive filters to the reference audio data to generate the estimated echo signal and remove the estimated echo signal from the audio signal X 113. Thus, the AEC outputs 715 correspond to the audio signal X 113 after removing the estimated echo signal. However, the disclosure is not limited thereto and in other examples, the AECs 710 may determine the estimated echo signal using other techniques known to one of skill in the art. Thus, the device 100 may perform AEC with or without the reference audio data without departing from the disclosure. For example, the device 100 may generate an estimated echo signal based on first portions of the audio signal X 113 and may remove the estimated echo signal from second portions of the audio signal X 113. In some examples, the AECs 710 may be positioned after the fixed beamformer (FBF) units 720. Additionally or alternatively, the AECs 710 may be combined with the ANCs 730 to perform acoustic interference cancellation (AIC).

A number of AEC components included in the AECs 710 may depend on a number of audio channels. In some examples, the device 100 may include an AEC component for each microphone, such that each microphone input is processed by a separate AEC component. For example, if the microphone array 102 includes eight microphones, the AECs 710 may include eight AEC components (e.g., 710a-710h). However, the disclosure is not limited thereto and the number of microphones and/or AEC components may vary without departing from the disclosure. Additionally or alternatively, a single AEC component may generate AEC outputs 715 for multiple microphones without departing from the disclosure.

After performing AEC to generate AEC outputs 715, the AEC outputs 715 may be input to one or more fixed beamformer (FBF) units 720. The fixed beamformer units may isolate audio from a desired direction by boosting audio received from the desired direction while dampening audio received from a non-desired direction. For example, each of the FBF units 720 may include a filter-and-sum structure to boost an audio signal that originates from the desired direction (e.g., look-direction) while largely attenuating audio signals that originate from other directions.

A number of fixed beamformer units included in the FBF units 720 may depend on a desired number of beams. For example, to generate twelve beams, the device 100 may include twelve separate fixed beamformer units (e.g., 720a-720l), with each fixed beamformer unit processing the AEC outputs 715 to generate an individual beam (e.g., directional output, directional audio signal, beamformed audio data, or the like) corresponding to a particular direction. The FBF units 720 may generate FBF unit outputs 725, which correspond to the desired number of beams. Thus, the AEC outputs 715 (or the audio signal X 113, if the AECs 710 are not included before the FBF units 720) are separated into a plurality of audio signals, enabling the device 100 to process audio data associated with a particular direction.

The FBF unit outputs 725 are input to adaptive noise cancellation (ANC) components 730. The ANC components 730 perform adaptive noise cancellation on the FBF unit outputs 725. For example, a first ANC component 730a may use a first FBF unit output 725a corresponding to a first direction as a target signal. The first ANC component 730a may estimate a noise reference signal using the remaining audio signals (e.g., audio signals not associated with the first direction, such as a second FBF unit output 725b corresponding to a second direction) and may remove the noise reference signal from the first FBF unit output 725a. Thus, the output of the first ANC 725a corresponds to audio data associated with the first direction after noise and/or interference is cancelled from the other directions.

A number of ANC components included in the ANCs 730 may depend on the desired number of beams and/or the number of FBF unit outputs 725. For example, if there are twelve beams output by the FBF units 720, the device 100 may include twelve ANCs 730 configured to perform adaptive noise cancellation and generate twelve ANC outputs 735. However, the disclosure is not limited thereto and the number of ANC components included in the ANCs 730 may vary without departing from the disclosure.

While FIG. 7A illustrates the ANCs 730 receiving only the FBF unit outputs 725, the disclosure is not limited thereto. In some examples, the ANCs 730 may receive the AEC outputs 715 along with the FBF unit outputs 725 and may perform adaptive noise cancellation using both the AEC outputs 715 and the FBF unit outputs 725. For example, the device 100 may apply filter(s) to the AEC outputs 715 prior to performing adaptive noise cancellation.

The ANCs 730 may output the ANC outputs 735 to a signal-to-noise (SNR) beam selector 740. The SNR beam selector 740 may select one of the ANC outputs 735 as an output beam 745. For example, the SNR beam selector 740 may determine one or more signal quality metrics (e.g., SNR, power value, signal-to-noise plus interference ratio (SINR), and/or other signal quality metrics known to one of skill in the art) associated with each of the ANC outputs 735 and may select the ANC output having the highest signal quality metric as the output beam 745.

The typical system illustrated in FIG. 7A suffers from a few drawbacks and/or inefficiencies. To illustrate a first example, performing ANC on each of the FBF unit outputs 725 is computationally extensive and results in a processing load on the device 100. For example, if the ANCs 730 perform adaptive noise cancellation on twelve different beams, using 65 subband adaptive filters, performing ANC requires 780 (e.g., 12×65) adaptive filters. To illustrate a second example, performing ANC may result in signal degradation which may negatively affect the output of the SNR beam selector 740. For example, the ANCs 730 may unintentionally suppress a desired signal, resulting in the SNR beam selector 740 failing to select the desired beam (e.g., selecting a beam with a highest SNR value that does not include the speech).

To improve the beam selection, FIG. 7B illustrates a system according to embodiments of the present disclosure. As illustrated in FIG. 7B, beam selection may be performed twice, with an additional component (e.g., signal interference ratio (SIR) beam selector 750) included prior to performing adaptive noise cancellation. Whereas FIG. 7A illustrates the ANCs 730 performing adaptive noise cancellation on each of the FBF unit outputs 725, the system illustrated in FIG. 7B performs adaptive noise cancellation on only a portion of the FBF unit outputs 725 based on a signal-to-interference (SIR) beam selector 750.

As illustrated in FIG. 7B, the FBF unit outputs 725 may be output to the SIR beam selector 750 prior to performing adaptive noise cancellation. The SIR beam selector 750 may determine a signal quality metric for each of the FBF unit outputs 725 and may select a portion of the FBF unit outputs 725 for further processing. The SIR beam selector 750 may determine selected beams 755 and may send the selected beams 755 and/or an indication of the selected beams 755 o the ANCs 730 and/or the SNR beam selector 740.

The ANCs 730 may perform adaptive noise cancellation only on the FBF unit outputs 725 indicated by the selected beams 755 output by the SIR beam selector 750. Thus, a complexity of performing adaptive noise cancellation is reduced based on the portion of the FBF unit outputs 725 selected by the SIR beam selector 750. For example, if the SIR beam selector 750 selects three beams out of twelve beams included in the FBF unit outputs 725, the ANCs 730 may perform adaptive noise cancellation on three beams instead of all twelve. Thus, performing ANC requires 195 (e.g., 3×65) adaptive filters, instead of 780 adaptive filters as in the previous example.

As a result, a number of ANC components included in the ANCs 730 may depend on the desired number of beams, the number of FBF unit outputs 725 and/or a portion of the plurality of audio signals based on signal metric values. For example, if the SIR beam selector 750 selects three beams, the device 100 may perform ANC using only three ANC components. However, the number of beams selected by the SIR beam selector 750 may vary without departing from the disclosure.

As the ANCs 730 only perform adaptive noise cancellation on a portion of the FBF unit outputs 725, the ANCs 730 generate fewer ANC outputs 735 relative to the system illustrated in FIG. 7A. For example, if the SIR beam selector 750 selects three beams, the ANC components 730 may generate three outputs (e.g., ANC outputs 735) and the SNR beam selector 740 may select the output beam 745 from the three outputs. In addition to reducing a complexity of performing adaptive noise cancellation, including the SIR beam selector 750 prior to performing adaptive noise cancellation may improve an accuracy of the SNR beam selector 740. For example, as the SIR beam selector 750 selects the selected beams 755 prior to adaptive noise cancellation, the SIR beam selector 750 is not affected by signal degradation resulting from the adaptive noise cancellation. Additionally or alternatively, the SIR beam selector 750 may select beams based on signal quality metrics that are tailored to speech, resulting in the selected beams 755 being more likely to correspond to speech. Thus, the SIR beam selector 750 may choose selected beams 755 that are more likely to include speech, ignoring beams that do not include speech, resulting in an increased likelihood that the SNR beam selector 740 selects the desired beam even if the ANCs 730 unintentionally suppress a desired signal.

Figure 8:
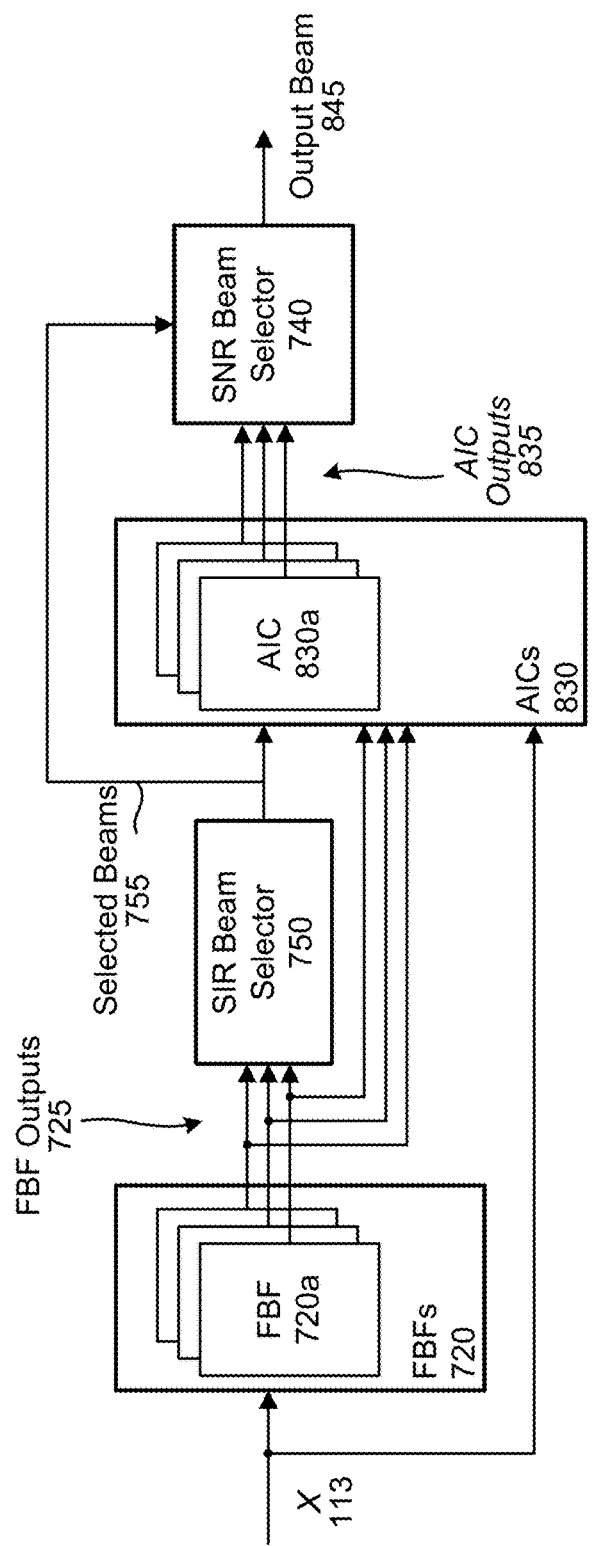
FIG. 8 illustrates an example of improving beam selection according to embodiments of the present disclosure.

FIG. 8 illustrates an example of improving beam selection according to embodiments of the present disclosure. As illustrated in FIG. 8, the AEC components may be combined with the ANC components to generate adaptive interference cancellation (AIC) components 830. Thus, the SIR beam selector 750 may be positioned after the FBF units 720 and may output the selected beams 755 to the AICs 830 instead of the ANCs 730 as illustrated in FIG. 7B. As illustrated in FIG. 8, the AICs 830 may generate AIC outputs 835 and the SNR beam selector 740 may select one of the AIC outputs 835 as an output beam 845.

The SIR beam selector 750 and the SNR beam selector 740 may use different algorithms to determine signal quality metrics and/or may use different decision making to select a beam to include for further processing. In some examples, the SIR beam selector 750 may determine first signal quality metrics based on a signal-to-interference (SIR) ratio, such as by dividing a target signal (e.g., first FBF unit output 725a) by an interference signal (e.g., noise reference signal selected based on the target signal), whereas the SNR beam selector 740 may determine second signal quality metrics based on a signal-to-noise ratio (e.g., comparing a maximum value of a first ANC output 735a to a noise floor included in the first ANC output 735). However, the disclosure is not limited thereto and the SIR beam selector 750 and the SNR beam selector 740 may use the same algorithm to determine signal quality metrics without departing from the disclosure.

In some examples, the SIR beam selector 750 may apply first decision making to select the selected beams 755, with the first decision making configured to select beams associated with speech. For example, the SIR beam selector 750 may determine a correlation value indicating an amount of correlation between the target signal (e.g., first FBF unit output 725a) and the interference signal. The SIR beam selector 750 may use the correlation value as a signal quality metric (e.g., ranking the FBF unit outputs 725 based on individual correlation values) or may use the correlation value in addition to signal quality metrics (e.g., filtering based on correlation value and selecting the beams with the highest signal quality metric). For example, as the correlation value indicates an amount of correlation between a target signal and an interference signal, a high correlation value may correspond to the target signal being similar to the interference signal (e.g., including a lot of noise), whereas a low correlation value may correspond to the target signal being different from the interference signal (e.g., including a minor amount of noise). Thus, the SIR beam selector 750 may exclude beams with a correlation value above a threshold and may select a beam with a highest signal quality metric from the remaining beams.

In some examples, the SIR beam selector 750 may select a fixed number of beams regardless of the signal quality metrics. For example, the SIR beam selector 750 may select three beams associated with the three highest signal quality metrics. However, the disclosure is not limited thereto and the SIR beam selector 750 may select a variable number of beams based on a threshold. In some examples, the SIR beam selector 750 may use a static threshold (e.g., fixed threshold for all beams over time), selecting any beam that has a signal quality metric about the static threshold. Additionally or alternatively, the SIR beam selector 750 may use a dynamic threshold (e.g., unique threshold for each set of FBF unit outputs 725), determining a distribution of the signal quality metrics and determining a threshold that separates the beams based on the distribution. For example, if four beams are associated with signal quality metrics that are grouped together at a first time, the SIR beam selector 750 may select all four beams as the selected beams 755. However, if two beams are associated with signal quality metrics that are grouped together at a second time, the SIR beam selector 750 may select only the two beams as the selected beams 755. Thus, the SIR beam selector 750 may prioritize quality (e.g., including any potential beam that has a high signal quality metric) or efficiency (e.g., limiting the selected beams 755 to a fixed number regardless of the signal quality metrics) without departing from the disclosure.

FIG. 9 illustrates an example of different thresholds according to embodiments of the present disclosure. As illustrated in FIG. 9, the device 100 may determine signal quality metrics $\alpha$ for each of the directional outputs (e.g., FBF unit outputs 725) and may separate the directional outputs using a first technique (e.g., fixed number 910), a second technique (e.g., static threshold 920), and/or a third technique (e.g., dynamic threshold 930).

As illustrated in FIG. 9, the first technique (e.g., fixed number 910) may select a fixed number (e.g., three) of directional outputs for further processing (e.g., indicated by the first group), regardless of a range of values of the signal metrics $\alpha_1$-$\alpha_6$. For example, signal metric chart 912 illustrates that the device 100 may select three signal metrics and group chart 914 illustrates that the device 100 selects the three highest signal metrics (e.g., $\alpha_1$, $\alpha_2$ and $\alpha_4$) as a first group and the three lowest signal metrics (e.g., $\alpha_3$, $\alpha_5$ and $\alpha_6$) as a second group. While FIG. 9 illustrates the three highest signal metrics (e.g., $\alpha_1$, $\alpha_2$ and $\alpha_4$) being relatively similar in value, the device 100 would select the three highest signal metrics regardless of a gap between the first highest signal metric (e.g., $\alpha_1$) and the second highest signal metric (e.g., $\alpha_4$) or a gap between the second highest signal metric (e.g., $\alpha_4$) and the third highest signal metric (e.g., $\alpha_2$).

Using the first technique, first directional outputs associated with the first group (e.g., Direction 1, Direction 2 and Direction 4) would be selected for additional processing. For example, the first directional outputs would be sent to one or more adaptive noise cancellers (e.g., ANCs 730) and adaptive filters would be applied to generate modified directional outputs. Second directional outputs associated with the second group (e.g., Direction 3, Direction 5 and Direction 6) would be ignored and would not be selected for additional processing.

In this example, the first technique reduces the number of directional outputs processed by the ANCs 730 in half from six to three. However, this is intended for illustrative purposes only and the disclosure is not limited thereto. Instead, the number of directional outputs selected may vary without departing from the disclosure. For example, the device 100 may select three directional outputs from twelve directional outputs, reducing the number from twelve to three. If each of the ANCs 730 adopt subband based adaptive filters using 65 frequency bands for each filter, the first technique reduces a complexity of the adaptive filtering from 12×65 to only 3×65.

In contrast to the first technique, the second technique (e.g., static threshold 920) may select a variable number of directional outputs in each group based on a static threshold 920. For example, signal metric chart 922 illustrates the static threshold 920 between the second signal metric (e.g., $\alpha_2$) and the fifth signal metric (e.g., $\alpha_5$). Thus, group chart 924 illustrates that the device 100 selects the signal metrics (e.g., $\alpha_1$, $\alpha_2$ and $\alpha_4$) above the static threshold 920 as a first group and the signal metrics (e.g., $\alpha_3$, $\alpha_5$ and $\alpha_6$) below the static threshold 920 as a second group. Depending on a value of the static threshold 920, the device 100 may select additional directional outputs in the first group and/or second group. For example, if the static threshold 920 was higher, the device 100 may only select the first signal metric (e.g., $\alpha_1$) and the fourth signal metric (e.g., $\alpha_4$) in the first group, including the second signal metric (e.g., $\alpha_2$) in the second group.

Using the second technique, first directional outputs associated with the first group (e.g., Direction 1, Direction 2 and Direction 4) would be selected for additional processing. For example, the first directional outputs would be sent to one or more adaptive noise cancellers (e.g., ANCs 730) and adaptive filters would be applied to generate modified directional outputs. Second directional outputs associated with the second group (e.g., Direction 3, Direction 5 and Direction 6) would be ignored and would not be selected for additional processing.

In this example, the second technique reduces the number of directional outputs processed by the ANCs 730 in half from six to three. However, this is intended for illustrative purposes only and the disclosure is not limited thereto. Instead, the number of directional outputs selected may vary without departing from the disclosure.

While the static threshold 920 may separate directional outputs using a fixed threshold, the static threshold 920 may not intelligently separate the directional outputs based on relative signal metrics of the directional outputs. In contrast, the third technique (e.g., dynamic threshold 930) may select a variable number of directional outputs in each group based on a dynamic threshold 930 that takes into account differences between signal metrics, a minimum signal metric threshold value, and/or additional information. For example, the device 100 may determine a first grouping of signal metrics (e.g., $\alpha_1$, $\alpha_2$, $\alpha_4$ and $\alpha_5$) within a threshold of each other, a second grouping of signal metrics (e.g., $\alpha_3$ and $\alpha_6$) and that there is a gap between the first grouping and the second grouping, as illustrated in signal metric chart 932. Based on the groupings and the gap between the groupings, the device 100 may select signal metrics (e.g., $\alpha_1$, $\alpha_2$, $\alpha_4$ and $\alpha_5$) as a first group and signal metrics (e.g., $\alpha_3$ and $\alpha_6$) as a second group. While the example illustrated in FIG. 9 results in a 4/2 configuration, the device 100 may select other configurations as the signal metrics vary. For example, if the fifth signal metric $\alpha_5$ decreases over time, the device 100 may determine that a gap between the second signal metric $\alpha_2$ and the fifth signal metric $\alpha_5$ exceeds a threshold and may switch the fifth signal metric $\alpha_5$ to the second group, resulting in a 3/3 configuration. Additionally or alternatively, if the second signal metric $\alpha_2$ and the fifth signal metric $\alpha_5$ decrease over time, the device 100 may determine that a gap between the first signal metric $\alpha_1$ and the second signal metric $\alpha_2$ exceeds the threshold and the device 100 may switch to a 2/4 configuration. The device 100 may use other configurations without departing from the disclosure.

Using the third technique, first directional outputs associated with the first group (e.g., Direction 1, Direction 2, Direction 4 and Direction 5) would be selected for additional processing. For example, the first directional outputs would be sent to one or more adaptive noise cancellers (e.g., ANCs 730) and adaptive filters would be applied to generate modified directional outputs. Second directional outputs associated with the second group (e.g., Direction 3 and Direction 6) would be ignored and would not be selected for additional processing.

In this example, the third technique reduces the number of directional outputs processed by the ANCs 730 from six to four. However, this is intended for illustrative purposes only and the disclosure is not limited thereto. Instead, the number of directional outputs selected may vary without departing from the disclosure.

While FIG. 9 illustrates the device 100 separating directional outputs (e.g., FBF unit outputs 725) using instantaneous signal metric values (e.g., signal metric values at a given time), the disclosure is not limited thereto. Instead, the device 100 may include hysteresis or delay when separating the directional outputs so that the device 100 selects the groups based on previous history as well as current signal metric values. To illustrate an example using the first technique (e.g., fixed number 910), the second signal metric $\alpha_2$ may be selected as part of the first group for a period of time before the second signal metric $\alpha_2$ drops below a third highest signal metric (e.g., fifth signal metric $\alpha_5$) and/or the fifth signal metric $\alpha_5$ exceeds the second signal metric $\alpha_2$. Despite the fifth signal metric $\alpha_5$ being larger than the second signal metric $\alpha_2$, the device 100 may continue to select the second signal metric $\alpha_2$ as part of the first group because the second signal metric $\alpha_2$ was previously part of the first group for the period of time. Additionally or alternatively, the device 100 may determine a weighted average over time for individual signal metrics and may group the directional outputs based on the weighted averages. Thus, the device 100 may incorporate previous history in determining the grouping so that rapid fluctuations in the signal metrics $\alpha$ do not result in regrouping the signal metrics $\alpha$. This hysteresis is beneficial in conversational environments where a first person may speak for a time and then a second person may respond; while the second signal metric $\alpha_2$ may be temporarily weak (e.g., second person is listening), the device 100 may want to include the second signal metric $\alpha_2$ as part of the first group for when the second signal metric $\alpha_2$ becomes strong again (e.g., second person is speaking).

The examples illustrated in FIG. 9 are based on six directional outputs and are included for ease of illustration; the disclosure is not limited thereto. For example, the device 100 may generate any number of directional outputs and may group the directional outputs using one or more configurations, such that a number of groups may vary.

Figure 10:
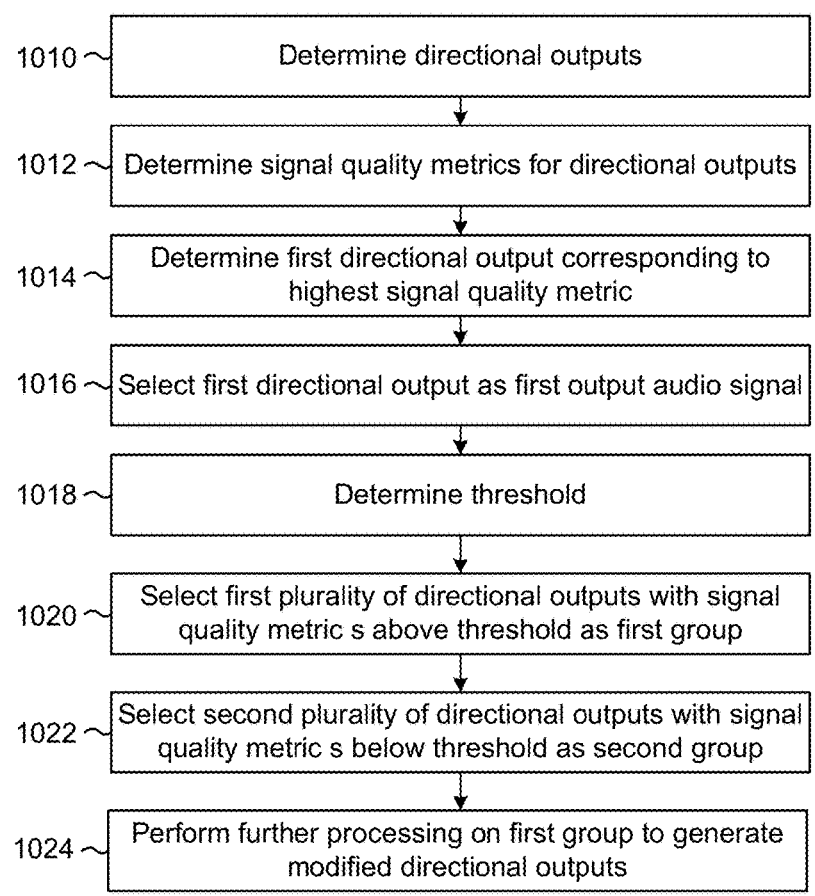
FIG. 10 is a flowchart conceptually illustrating an example method for selecting first beams for further processing from a plurality of beams according to embodiments of the present disclosure.

FIG. 10 is a flowchart conceptually illustrating an example method for selecting first beams for further processing from a plurality of beams according to embodiments of the present disclosure. As illustrated in FIG. 10, the device 100 may determine (1010) directional outputs. For example, the device 100 may receive audio input from the microphones 118, may perform audio beamforming to separate the audio input into separate directions, may determine target signal(s) and reference signal(s), remove an echo from the target signal(s) by removing the reference signal(s) to isolate speech or additional sounds, and may generate the directional outputs.

The device 100 may determine (1012) signal quality metrics for the directional outputs, such as signal-to-noise ratios (SNRs) or a magnitude of power associated with the directional outputs. For example, the device 100 may determine a first SNR associated with the first directional output, a second SNR associated with a second directional output, etc. However, SNR is just a single example of a parameter or characteristic associated with the directional outputs and the present disclosure is not limited thereto. Instead of using SNRs, the device 100 may compare the directional outputs using other characteristics or parameters (e.g., signal strength, power, etc.).

The device 100 may determine (1014) a first directional output corresponding to a highest signal quality metric and may select (1016) the first directional output as a first audio output. For example, the device 100 may determine that the second SNR associated with the second directional output is the largest SNR value of the directional outputs and may select the second directional output as the first audio output.

The device 100 may determine (1018) a threshold, select (1020) a first plurality of directional outputs with signal metrics above the threshold and select (1022) a second plurality of directional outputs with signal metrics below the threshold. For example, the device 100 may use the techniques discussed above with regard to FIG. 9 to determine the threshold and separate the directional outputs into the first plurality and the second plurality. While not illustrated in steps 1020 and/or 1022, the device 100 may include hysteresis or delay when separating the directional outputs so that the device 100 selects the groups based on previous history as well as current signal metric values. For example, the device 100 may continue to select the second signal metric $\alpha_2$ as part of the first group for a duration of time after the second signal metric $\alpha_2$ justifies the second signal metric $\alpha_2$ being included in the second group. Additionally or alternatively, the device 100 may determine a weighted average over time for individual signal metrics and may select the first plurality of directional outputs and the second plurality of directional outputs based on the weighted averages.

The device 100 may perform (1024) further processing on the first group to generate modified directional outputs. For example, the device 100 may perform adaptive noise cancellation (ANC) using ANCs 730, as discussed above. However, the disclosure is not limited thereto and the device 100 may perform any additional processing, including processing that does not involve ANC, without departing from the disclosure.

While steps 1020-1022 illustrate an example of the device 100 separating the directional outputs into two different groups, the device 100 may select various numbers of directional outputs in each of the groups, as illustrated in FIG. 9. For example, the device 100 may select two directional outputs in the first group and four directional outputs in the second group (e.g., a 2/4 configuration), three directional outputs in the first group and three directional outputs in the second group (e.g., a 3/3 configuration), four directional outputs in the first group and two directional outputs in the second group (e.g., a 4/2 configuration), and/or any other combination of directional outputs.

In some examples, the signal metric values may be absolute values, such as an amount of power in each of the directional outputs. For example, the device 100 may determine the amount of power for each of the directional outputs and then compare between the directional outputs to select first directional outputs having the highest power values. However, the disclosure is not limited thereto and in other examples, the signal metric values may be relative values, such as a ratio between an amount of power associated with a directional output (e.g., FBF unit outputs 725) and an amount of power associated with noise reference signal(s).

FIGS. 11A-11B illustrate examples of noise reference signals according to embodiments of the present disclosure. The device 100 may determine the noise reference signal(s) using a variety of techniques. In some examples, the device 100 may use the same noise reference signal(s) for each of the directional outputs. For example, the device 100 may select a first directional output associated with a particular direction as a noise reference signal and may determine the signal quality metric for each of the directional outputs by dividing a power value associated with an individual directional output by a power value associated with the first directional output (e.g., noise power level). Thus, the device 100 may determine a first signal quality metric by dividing a first power level associated with a second directional output by the noise power level, may determine a second signal quality metric by dividing a second power level associated with a third directional output by the noise power level, and so on. As the noise reference signal is the same for each of the directional outputs, instead of determining a ratio the device 100 may use the power level associated with each of the directional outputs as the signal quality metrics.

In some examples, each directional output may be associated with unique noise reference signal(s). To illustrate an example, the device 100 may determine the noise reference signal(s) using a fixed configuration based on the directional output. For example, the device 100 may select a first directional output (e.g., Direction 1) and may choose a second directional output (e.g., Direction 5, opposite Direction 1 when there are eight beams corresponding to eight different directions) as a first noise reference signal for the first directional output, may select a third directional output (e.g., Direction 2) and may choose a fourth directional output (e.g., Direction 6) as a second noise reference signal for the third directional output, and so on. This is illustrated in FIG. 11A as a single fixed noise reference configuration 1110.

As illustrated in FIG. 11A, in the single fixed noise reference configuration 1110, the device 100 may select a seventh directional output (e.g., Direction 7) as a target signal 1112 and select a third directional output (e.g., Direction 3) as a noise reference signal 1114. The device 100 may continue this pattern for each of the directional outputs, using Direction 1 as a target signal and Direction 5 as a noise reference signal, Direction 2 as a target signal and Direction 6 as a noise reference signal, Direction 3 as a target signal and Direction 7 as a noise reference signal, Direction 4 as a target signal and Direction 8 as a noise reference signal, Direction 5 as a target signal and Direction 1 as a noise reference signal, Direction 6 as a target signal and Direction 2 as a noise reference signal, Direction 7 as a target signal and Direction 3 as a noise reference signal, and Direction 8 as a target signal and Direction 4 as a noise reference signal.

As an alternative, the device 100 may use a double fixed noise reference configuration 1120. For example, the device 100 may select the seventh directional output (e.g., Direction 7) as a target signal 1122 and may select a second directional output (e.g., Direction 2) as a first noise reference signal 1124a and a fourth directional output (e.g., Direction 4) as a second noise reference signal 1124b. The device 100 may continue this pattern for each of the directional outputs, using Direction 1 as a target signal and Directions 4/6 as noise reference signals, Direction 2 as a target signal and Directions 5/7 as noise reference signals, Direction 3 as a target signal and Directions 6/8 as noise reference signals, Direction 4 as a target signal and Directions 7/9 as noise reference signal, Direction 5 as a target signal and Directions 8/2 as noise reference signals, Direction 6 as a target signal and Directions 1/3 as noise reference signals, Direction 7 as a target signal and Directions 2/4 as noise reference signals, and Direction 8 as a target signal and Directions 3/5 as noise reference signals.

While FIG. 11A illustrates using a fixed configuration to determine noise reference signal(s), the disclosure is not limited thereto. FIG. 11B illustrates examples of the device 100 selecting noise reference signal(s) differently for each target signal. As a first example, the device 100 may use a global noise reference configuration 1130. For example, the device 100 may select the seventh directional output (e.g., Direction 7) as a target signal 1132 and may select the first directional output (e.g., Direction 1) as a first noise reference signal 1134a and the second directional output (e.g., Direction 2) as a second noise reference signal 1134b. The device 100 may use the first noise reference signal 1134a and the second noise reference signal 1134b for each of the directional outputs (e.g., Directions 1-8).

As a second example, the device 100 may use an adaptive noise reference configuration 1140, which selects two directional outputs as noise reference signals for each target signal. For example, the device 100 may select the seventh directional output (e.g., Direction 7) as a target signal 1142 and may select the third directional output (e.g., Direction 3) as a first noise reference signal 1144a and the fourth directional output (e.g., Direction 4) as a second noise reference signal 1144b. However, the noise reference signals may vary for each of the target signals, as illustrated in FIG. 11B.

As a third example, the device 100 may use an adaptive noise reference configuration 1150, which selects one or more directional outputs as noise reference signals for each target signal. For example, the device 100 may select the seventh directional output (e.g., Direction 7) as a target signal 1152 and may select the second directional output (e.g., Direction 2) as a first noise reference signal 1154a, the third directional output (e.g., Direction 3) as a second noise reference signal 1154b, and the fourth directional output (e.g., Direction 4) as a third noise reference signal 1154c.

However, the noise reference signals may vary for each of the target signals, as illustrated in FIG. 11B, with a number of noise reference signals varying between one (e.g., Direction 6 as a noise reference signal for Direction 2) and four (e.g., Directions 1-3 and 8 as noise reference signals for Direction 6).

In some examples, the device 100 may determine a number of noise references based on a number of dominant audio sources. For example, if someone is talking while music is playing over loudspeakers and a blender is active, the device 100 may detect three dominant audio sources (e.g., talker, loudspeaker, and blender) and may select one dominant audio source as a target signal and two dominant audio sources as noise reference signals. Thus, the device 100 may select first audio data corresponding to the person speaking as a first target signal and select second audio data corresponding to the loudspeaker and third audio data corresponding to the blender as first reference signals. Similarly, the device 100 may select the second audio data as a second target signal and the first audio data and the third audio data as second reference signals, and may select the third audio data as a third target signal and the first audio data and the second audio data as third reference signals.

Additionally or alternatively, the device 100 may track the noise reference signal(s) over time. For example, if the music is playing over a portable loudspeaker that moves around the room, the device 100 may associate the portable loudspeaker with a noise reference signal and may select different portions of the beamformed audio data based on a location of the portable loudspeaker. Thus, while the direction associated with the portable loudspeaker changes over time, the device 100 selects beamformed audio data corresponding to a current direction as the noise reference signal.

While some of the examples described above refer to determining instantaneous values for a signal quality metric (e.g., a signal-to-interference ratio (SIR), a signal-to-noise ratio (SNR), or the like), the disclosure is not limited thereto. Instead, the device 100 may determine the instantaneous values and use the instantaneous values to determine average values for the signal quality metric. Thus, the device 100 may use average values or other calculations that do not vary drastically over a short period of time in order to select which signals on which to perform additional processing. For example, a first audio signal associated with an audio source (e.g., person speaking, loudspeaker, etc.) may be associated with consistently strong signal quality metrics (e.g., high SIR/SNR) and intermittent weak signal quality metrics. The device 100 may average the strong signal metrics and the weak signal quality metrics and continue to track the audio source even when the signal quality metrics are weak without departing from the disclosure.

FIG. 12 is a flowchart conceptually illustrating an example method for generating an output audio signal according to embodiments of the present disclosure. As illustrated in FIG. 12, the device 100 may receive (1210) first audio data from a microphone array and may optionally perform (1212) acoustic echo cancellation to generate second audio data. The device 100 may perform (1214) beamforming to generate a plurality of audio signals corresponding to a plurality of directions (e.g., perform a beamforming operation to generate beamformed audio data) and may determine (1216) first signal quality metrics associated with the plurality of audio signals.

The device 100 may optionally determine (1218) a threshold value and/or determine (1220) a first number of audio signals to select, as described in greater detail above with regard to FIG. 9. The device 100 may select (1222) first audio signals for further processing and may apply (1224) adaptive filters to the first audio signals to generate second audio signals. For example, the device 100 may perform adaptive noise cancellation or acoustic interference cancellation on the first audio signals to generate the second audio signals.

The device 100 may determine (1226) second signal quality metric values associated with the second audio signals and may select (1228) an output audio signal from the second audio signals. For example, the device 100 may select a single audio signal from the second audio signals as the output audio signal, which may be sent to additional components and/or a remote device for further processing.

Various machine learning techniques may be used to perform the training of the SIR beam selector 750 or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 13:
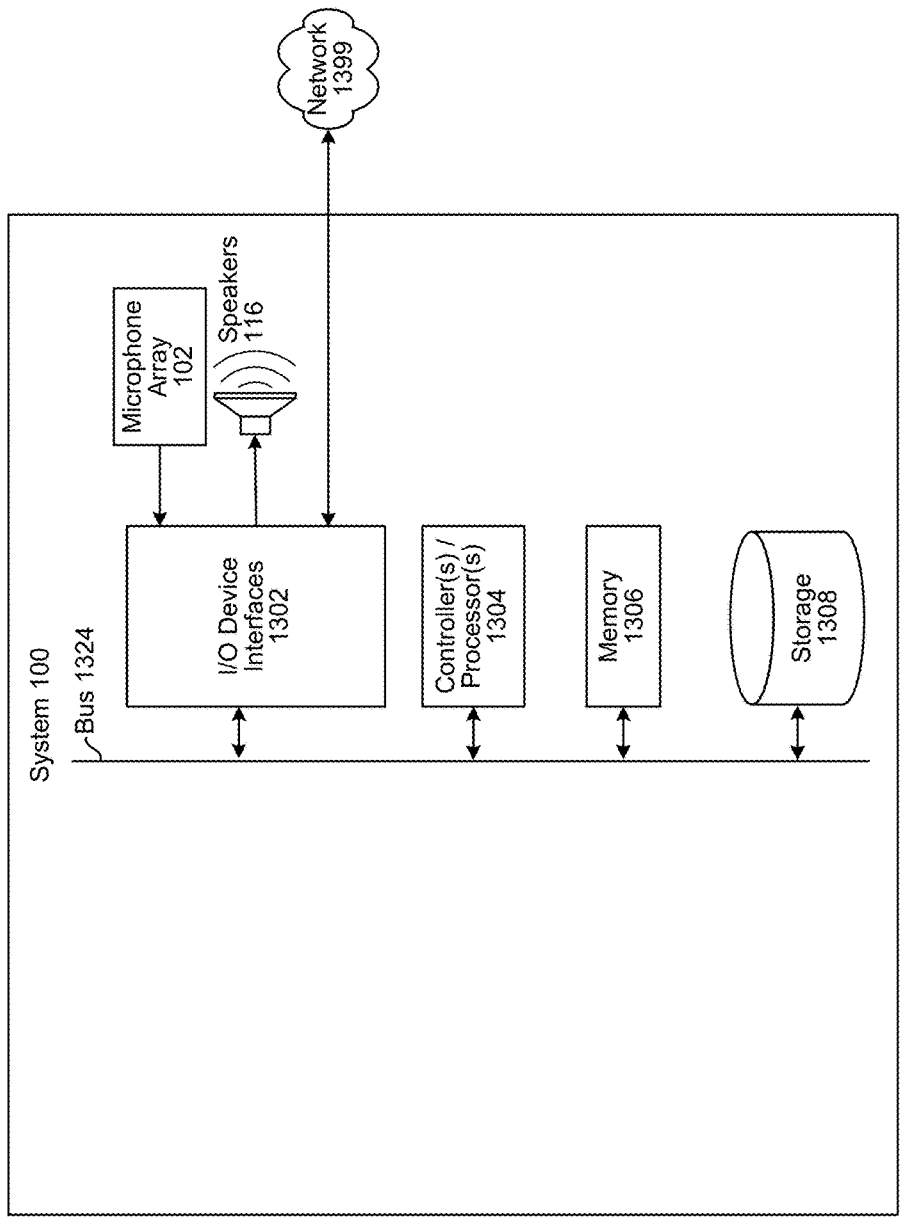
FIG. 13 is a block diagram conceptually illustrating example components of a device according to embodiments of the present disclosure.

FIG. 13 is a block diagram conceptually illustrating example components of the device 100. In operation, the device 100 may include computer-readable and computer-executable instructions that reside on the device, as will be discussed further below.

The device 100 may include one or more audio capture device(s), such as a microphone array 102 which may include a plurality of microphones 202. The audio capture device(s) may be integrated into a single device or may be separate.

The device 100 may also include an audio output device for producing sound, such as speaker(s) 116. The audio output device may be integrated into a single device or may be separate.

The device 100 may include an address/data bus 1324 for conveying data among components of the device 100. Each component within the device may also be directly connected to other components in addition to (or instead of) being connected to other components across the bus 1324.

The device 100 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 100 may also include a data storage component 1308, for storing data and controller/processor-executable instructions (e.g., instructions to perform operations discussed herein). The data storage component 1308 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 1302.

Computer instructions for operating the device 100 and its various components may be executed by the controller(s)/processor(s) 1304, using the memory 1306 as temporary "working" storage at runtime. The computer instructions may be stored in a non-transitory manner in non-volatile memory 1306, storage 1308, or an external device. Alternatively, some or all of the executable instructions may be embedded in hardware or firmware in addition to or instead of software.

The device 100 may include input/output device interfaces 1302. A variety of components may be connected through the input/output device interfaces 1302, such as the speaker(s) 116, the microphone array 120, and a media source such as a digital media player (not illustrated). The input/output interfaces 1302 may include A/D converters (not shown) and/or D/A converters (not shown).

The input/output device interfaces 1302 may also include an interface for an external peripheral device connection such as universal serial bus (USB), FireWire, Thunderbolt or other connection protocol. The input/output device interfaces 1302 may also include a connection to one or more networks 1399 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1399, the device 100 may be distributed across a networked environment.

Multiple devices may be employed in a single device 100. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components such as an FBF unit 140 (including filter and sum component 130), adaptive beamformer (ABF) unit 160, may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the adaptive beamformer unit 160, beamformer unit 190, etc. may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data, the input audio data corresponding to input audio captured by a microphone array;
   performing beamforming on the input audio data to determine a plurality of beamformed audio data, the plurality of beamformed audio data including:
      first beamformed audio data corresponding to a first direction,
      second beamformed audio data corresponding to a second direction, and
      third beamformed audio data corresponding to a third direction;
   determining a first signal-to-interference ratio (SIR) associated with the first beamformed audio data;
   determining a second SIR associated with the second beamformed audio data;
   determining a third SIR associated with the third beamformed audio data;
   determining that the first SIR is above a threshold value that corresponds to a strong audio signal;
   determining that the second SIR is above the threshold value;
   determining that the third SIR is below the threshold value;
   performing adaptive noise cancellation on the first beamformed audio data to generate first modified beamformed audio data;
   performing adaptive noise cancellation on the second beamformed audio data to generate second modified beamformed audio data;
   determining a first signal-to-noise ratio (SNR) associated with the first modified beamformed audio data;
   determining a second SNR associated with the second modified beamformed audio data;
   determining that the first SNR is greater than the second SNR; and
   sending the first modified beamformed audio data for further processing.

2. The computer-implemented method of claim 1, further comprising:
   selecting a first portion of the plurality of beamformed audio data as a first noise reference signal;
   selecting a second portion of the plurality of beamformed audio data as a second noise reference signal;
   combining the first noise reference signal and the second noise reference signal to generate interference data; and
   determining the first SIR by dividing a first power value associated with the first beamformed audio data by a second power value associated with the interference data.

3. The computer-implemented method of claim 1, further comprising:
   determining a first difference between the first SIR and the second SIR;
   determining a second difference between the first SIR and the third SIR;
   determining that the first difference is below a second threshold value, the second threshold value representing that SIR values are similar in magnitude;
   determining that the second difference is above the second threshold value; and
   performing the adaptive noise cancellation on the first beamformed audio data and the second beamformed audio data.

4. The computer-implemented method of claim 1, further comprising, prior to performing adaptive noise cancellation on the first beamformed audio data:
   determining a fourth SIR associated with fourth beamformed audio data of the plurality of beamformed audio data;
   determining that the fourth SIR is above the threshold value;
   selecting a first noise reference signal from the plurality of beamformed audio data;
   determining a first correlation value representing a first correlation indicating a similarity between the first beamformed audio data and the first noise reference signal;
   selecting second noise reference signal from the plurality of audio data;
   determining a second correlation value representing a second correlation between the fourth beamformed audio data and the second noise reference signal;
   determining that the first correlation value is below a second threshold value, the second threshold value representing whether signals are similar;
   determining that the second correlation value is above the second threshold value;

performing adaptive noise cancellation on the first beamformed audio data in response to the first correlation value being below the second threshold value; and
determining not to perform adaptive noise cancellation on the fourth beamformed audio data in response to the second correlation value being above the second threshold value.

5. A computer-implemented method comprising:
receiving input audio data corresponding to input audio captured by a microphone array;
determining, from the input audio data, a plurality of audio signals, each audio signal of the plurality of audio signals corresponding to a respective direction;
selecting, from the plurality of audio signals, a first audio signal corresponding to a first direction and a second audio signal corresponding to a second direction, wherein the selecting uses at least one signal quality metric;
performing adaptive noise cancellation on the first audio signal to generated a modified first audio signal;
performing adaptive noise cancellation on the second audio signal to generate a modified second audio signal;
determining a second signal quality metric associated with the modified first audio signal;
determining a third signal quality metric associated with the modified second audio signal;
determining that the second signal quality metric indicates a better signal quality than the third signal quality metric; and
outputting the modified first audio signal.

6. The computer-implemented method of claim 5, further comprising:
determining a first number of audio signals of the plurality of audio signals, each of the first number of audio signals having a higher signal quality metric than each of a remaining second number of audio signals of the plurality of audio signals;
and
performing adaptive noise cancellation on the first number of audio signals, the first number of audio signals including the first audio signal and the second audio signal.

7. The computer-implemented method of claim 5, further comprising:
determining a fourth signal quality metric associated with the first audio signal;
determining a fifth signal quality metric associated with the second audio signal;
determining a sixth signal quality metric associated with a third audio signal of the plurality of audio signals, the third audio signal corresponding to a third direction;
selecting, based on the fourth signal quality metric, the first audio signal for further processing;
selecting, based on the fifth signal quality metric, the second audio signal for further processing; and
determining, based on the sixth signal quality metric, not to select the third audio signal for further processing.

8. The computer-implemented method of claim 7, further comprising:
determining a first difference between the first signal quality metric and the second signal quality metric;
determining a second difference between the first signal quality metric and the third signal quality metric;
determining that the first difference is below a threshold value;
determining that the second difference is above the threshold value; and
determining, based on the first difference and the second difference, a first number of the plurality of audio signals to select for further processing.

9. The computer-implemented method of claim 5, further comprising:
selecting a first noise reference signal from the plurality of audio signals;
selecting a second noise reference signal from the plurality of audio signals;
determining, based on the first noise reference signal and the second noise reference signal, an interference signal; and
determining a fourth signal quality metric by dividing a first power value associated with the first audio signal by a second power value associated with the interference signal.

10. The computer-implemented method of claim 5, further comprising:
determining a fourth signal quality metric associated with the first audio signal by dividing a first power value associated with the first audio signal by a second power value associated with a first interference signal; and
determining a fifth signal quality metric associated with the second audio signal by dividing a third power value associated with the second audio signal by the second power value associated with the first interference signal.

11. The computer-implemented method of claim 5, further comprising:
selecting a first noise reference signal from the plurality of audio signals;
determining a fourth signal quality metric associated with the first audio signal by dividing a first power value associated with the first audio signal by a second power value associated with the first noise reference signal;
selecting a second noise reference signal from the plurality of audio signals; and
determining a fifth signal quality metric associated with the second audio signal by dividing a third power value associated with the second audio signal by a fourth power value associated with the second noise reference signal.

12. The computer-implemented method of claim 5, further comprising, prior to performing adaptive noise cancellation on the first audio signal:
determining a fourth signal quality metric associated with the first audio signal;
determining a fifth signal quality metric associated with a third audio signal;
determining that the fourth signal quality metric is above a threshold value;
determining that the fifth signal quality metric is above the threshold value;
selecting a first noise reference signal from the plurality of audio signals;
determining a first correlation value representing a first correlation between the first audio signal and the first noise reference signal;
selecting a second noise reference signal from the plurality of audio signals;
determining a second correlation value representing a second correlation between the fourth audio signal and the second noise reference signal;
determining that the first correlation value is below a second threshold value;

determining that the second correlation value is above the second threshold value;
performing adaptive noise cancellation on the first audio signal in response to the fourth signal quality metric being above the threshold value and the first correlation value being below the second threshold value; and
determining not to perform adaptive noise cancellation on the fourth audio signal in response to the second correlation value being above the second threshold value.

13. A device comprising:
at least one processor;
at least one microphone array comprising a plurality of microphones;
at least one memory including instructions operable to be executed by the at least one processor to configure the device to:
receive input audio data corresponding to input audio captured by a microphone array;
determine, from the input audio data, a plurality of audio signals, each audio signal of the plurality of audio signals corresponding to a respective direction;
select, from the plurality of audio signals, a first audio signal corresponding to a first direction and a second audio signal corresponding to a second direction, wherein the selecting uses at least one signal quality metric;
perform adaptive noise cancellation on the first audio signal to generated a modified first audio signal;
perform adaptive noise cancellation on the second audio signal to generate a modified second audio signal;
determine a second signal quality metric associated with the modified first audio signal;
determine a third signal quality metric associated with the modified second audio signal;
determine that the second signal quality metric indicates a better signal quality than the third signal quality metric; and
output the modified first audio signal.

14. The device of claim 13, wherein the instructions further configure the device to:
determine a first number of audio signals of the plurality of audio signals, each of the first number of audio signals having a higher signal quality metric than each of a remaining second number of audio signals of the plurality of audio signals; and
perform adaptive noise cancellation on the first number of audio signals, the first number of audio signals including the first audio signal and the second audio signal.

15. The device of claim 13, wherein the instructions further configure the device to:
determine a fourth signal quality metric associated with the first audio signal;
determine a fifth signal quality metric associated with the second audio signal;
determine a sixth signal quality metric associated with a third audio signal of the plurality of audio signals, the third audio signal corresponding to a third direction;
select, based on the fourth signal quality metric, the first audio signal for further processing;
select, based on the fifth signal quality metric, the second audio signal for further processing; and
determine, based on the sixth signal quality metric, not to select the third audio signal for further processing.

16. The device of claim 15, wherein the instructions further configure the device to:
determine a first difference between the first signal quality metric and the second signal quality metric;
determine a second difference between the first signal quality metric and the third signal quality metric;
determine that the first difference is below a threshold value;
determine that the second difference is above the threshold value; and
determine, based on the first difference and the second difference, a first number of the plurality of audio signals to select for further processing.

17. The device of claim 13, wherein the instructions further configure the device to:
select a first noise reference signal from the plurality of audio signals;
select a second noise reference signal from the plurality of audio signals;
determine, based on the first noise reference signal and the second noise reference signal, an interference signal; and
determine a fourth signal quality metric associated with the first audio signal by dividing a first power value associated with the first audio signal by a second power value associated with the interference signal.

18. The device of claim 13, wherein the instructions further configure the device to:
determine a fourth signal quality metric associated with the first audio signal by dividing a first power value associated with the first audio signal by a second power value associated with a first interference signal; and
determine a fifth signal quality metric associated with the second audio signal by dividing a third power value associated with the second audio signal by the second power value associated with the first interference signal.

19. The device of claim 13, wherein the instructions further configure the device to:
select a first noise reference signal from the plurality of audio signals;
determine a fourth signal quality metric associated with the first audio signal by dividing a first power value associated with the first audio signal by a second power value associated with the first noise reference signal;
select a second noise reference signal from the plurality of audio signals; and
determine a fifth signal quality metric associated with the second audio signal by dividing a third power value associated with the second audio signal by a fourth power value associated with the second noise reference signal.

20. The device of claim 13, wherein the instructions further configure the device to prior to performing adaptive noise cancellation on the first audio signal:
determine a fourth signal quality metric associated with the first audio signal;
determine a fifth signal quality metric associated with a third audio signal;
determine that the fourth signal quality metric is above a threshold value;
determine that the fifth signal quality metric is above the threshold value;
select a first noise reference signal from the plurality of audio signals;

determine a first correlation value representing a first correlation between the first audio signal and the first noise reference signal;
select a second noise reference signal from the plurality of audio signals;
determine a second correlation value representing a second correlation between the fourth audio signal and the second noise reference signal;
determine that the first correlation value is below a second threshold value;
determine that the second correlation value is above the second threshold value;
determine to perform adaptive noise cancellation on the first audio signal in response to the fourth signal quality metric being above the threshold value and the first correlation value being below the second threshold value; and
determine not to perform adaptive noise cancellation on the fourth audio signal in response to the second correlation value being above the second threshold value.

\* \* \* \* \*